United States Patent
Cho

(10) Patent No.: US 9,063,322 B2
(45) Date of Patent: *Jun. 23, 2015

(54) ZOOM LENS AND IMAGING APPARATUS

(71) Applicant: FUJIFILM Corporation, Tokyo (JP)

(72) Inventor: Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,860

(22) Filed: Dec. 13, 2013

(65) Prior Publication Data

US 2014/0104698 A1    Apr. 17, 2014

Related U.S. Application Data

(63) Continuation of application No. PCT/JP2012/003971, filed on Jun. 19, 2012.

(30) Foreign Application Priority Data

Jun. 22, 2011 (JP) ................................. 2011-138434

(51) Int. Cl.
  *G02B 15/14* (2006.01)
  *G02B 15/173* (2006.01)
(52) U.S. Cl.
  CPC .............. *G02B 15/14* (2013.01); *G02B 15/173* (2013.01); *G03B 2205/0046* (2013.01)
(58) Field of Classification Search
  CPC ............................... G02B 15/173; G02B 15/14
  USPC ......................................................... 359/686
  See application file for complete search history.

(56) References Cited

U.S. PATENT DOCUMENTS 4,666,257 A    5/1987    Tanaka et al.
4,917,482 A    4/1990    Ito
(Continued)

FOREIGN PATENT DOCUMENTS

JP    60-178421    9/1985
JP    1-178912    7/1989
(Continued)

OTHER PUBLICATIONS

NPL English-Language-Translation of International Preliminary Report on Patentability (PCT/IPEA/409) Chapter II prepared for PCT/JP2012/003971 on Dec. 23, 2013.*
(Continued)

*Primary Examiner* — David N Spector
(74) *Attorney, Agent, or Firm* — Young & Thompson

(57) ABSTRACT

A zoom lens includes: a first lens group having a positive power; a second lens group having a negative power; a third lens group having a positive power; and a fourth lens group having a negative power, in this order from an object side. All of the groups move along an optical axis such that the distance between the first group and the second group gradually becomes greater, the distance between the second group and the third group gradually becomes smaller, and the distance between the third group and the fourth group gradually becomes greater, when changing magnification from a wide angle to a telephoto end. The zoom lens satisfies the conditional formulae: $-2.0<\text{fw}/\text{f2}<-0.8$; and $-1.0<\text{fw}/\text{f4}<-0.2$, wherein fw is the focal length of the entire system at the wide angle end, f2 is the focal length of the second group, and f4 is the focal length of the fourth group.

6 Claims, 13 Drawing Sheets

(56) References Cited

U.S. PATENT DOCUMENTS

| | | |
|---|---|---|
| 5,105,311 A | 4/1992 | Tokumaru et al. |
| 5,572,277 A | 11/1996 | Uzawa et al. |
| 6,191,895 B1 | 2/2001 | Arimoto et al. |
| 6,449,433 B2 | 9/2002 | Hagimori et al. |
| 7,423,813 B2 | 9/2008 | Kamo |
| 2005/0219708 A1 | 10/2005 | Shibayama et al. |

FOREIGN PATENT DOCUMENTS

| | | |
|---|---|---|
| JP | 3-083005 | 4/1991 |
| JP | 4-296809 | 10/1992 |
| JP | 7-005361 | 1/1995 |
| JP | 11-109241 | 4/1999 |
| JP | 2005-284097 | 10/2005 |

OTHER PUBLICATIONS

NPL English-Language-Translation of PCT/JP2012/003971 as originally filed on Jun. 19, 2012.*

International Search Report, PCT/JP2012/003971, Sep. 4, 2012.

* cited by examiner

FIG.5 EXAMPLE 5

FIG.6 EXAMPLE 6

FIG.7
EXAMPLE 1
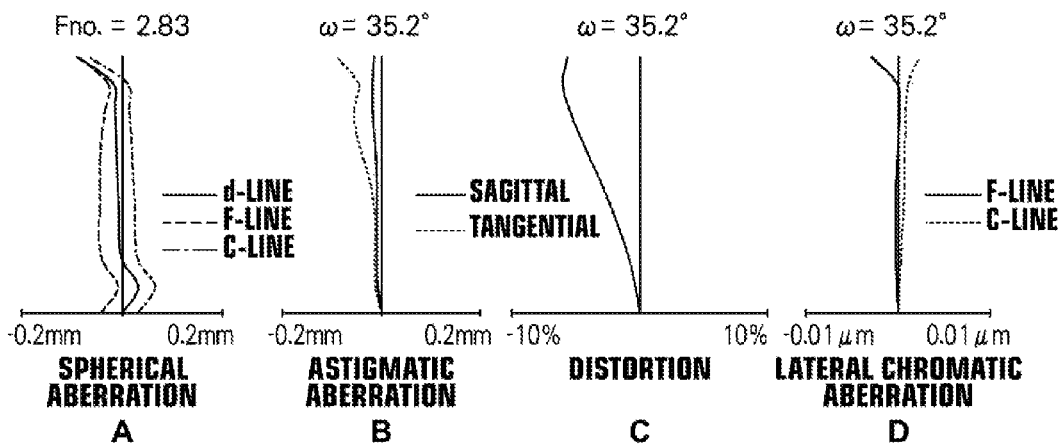
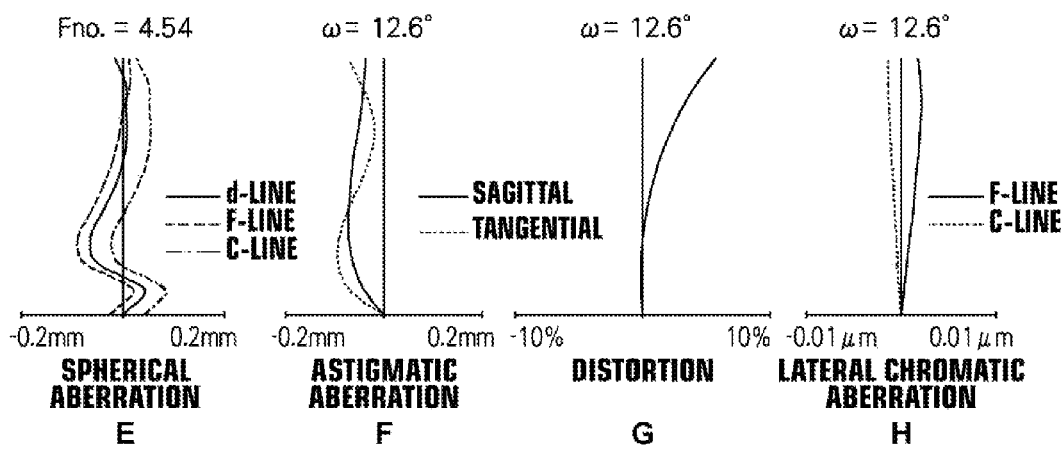
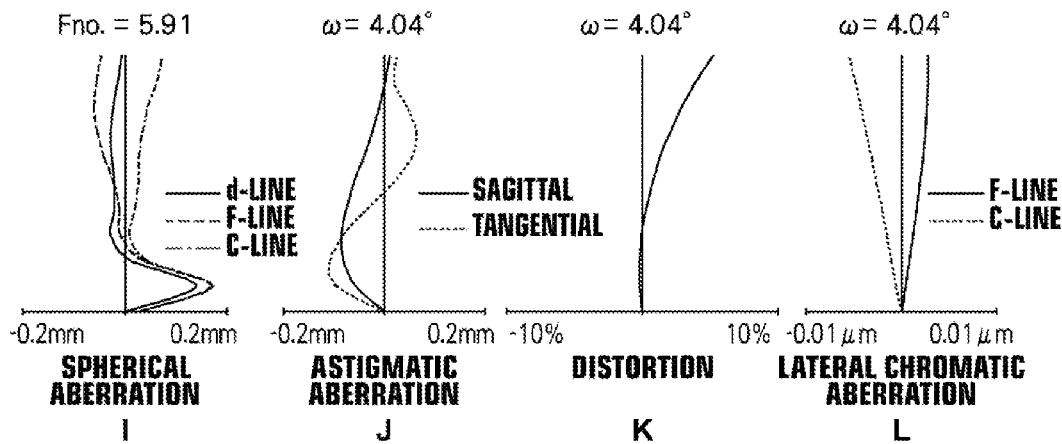

FIG.8
EXAMPLE 2
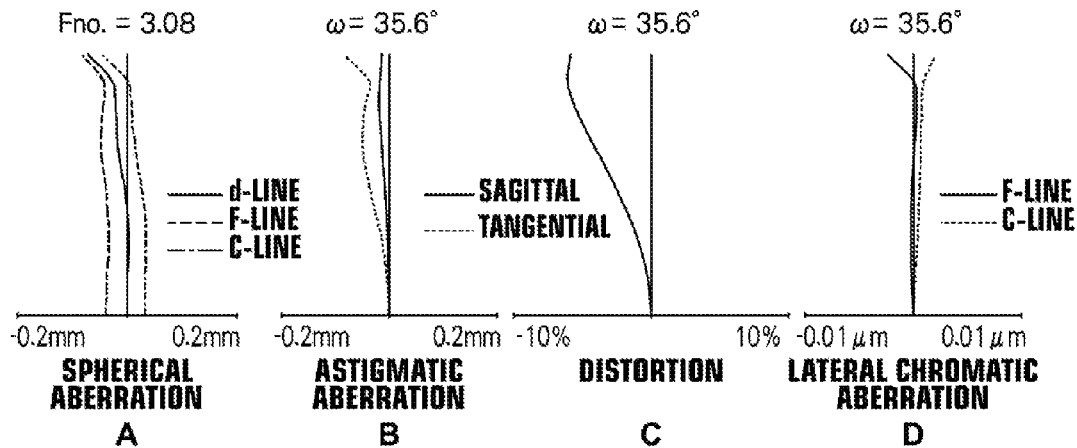
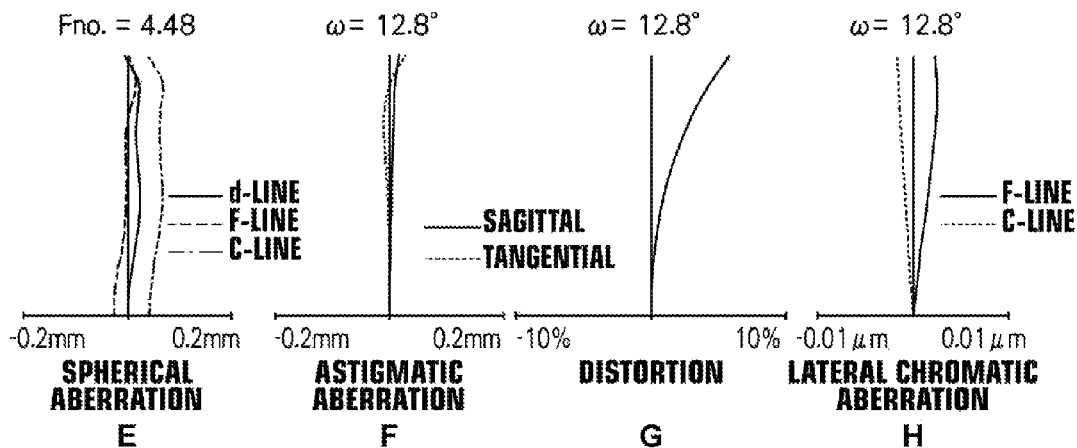
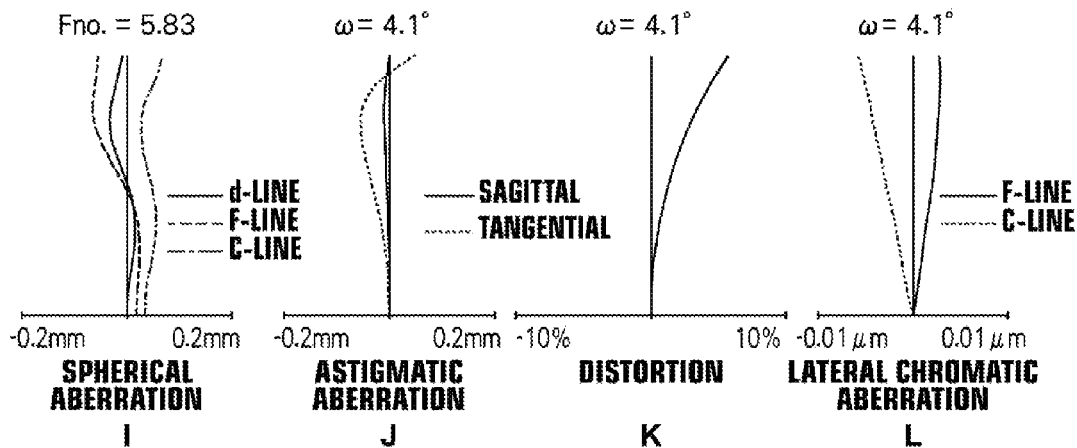

EXAMPLE 3 FIG.9
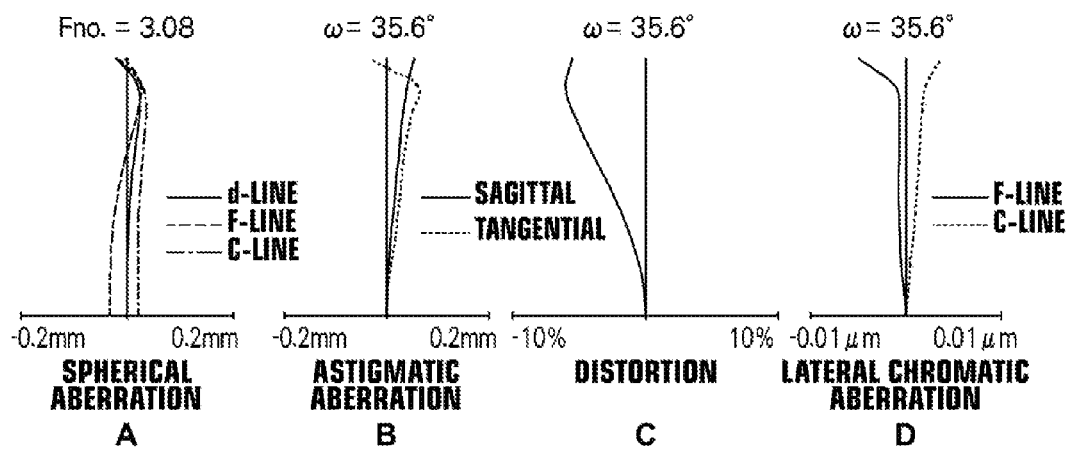
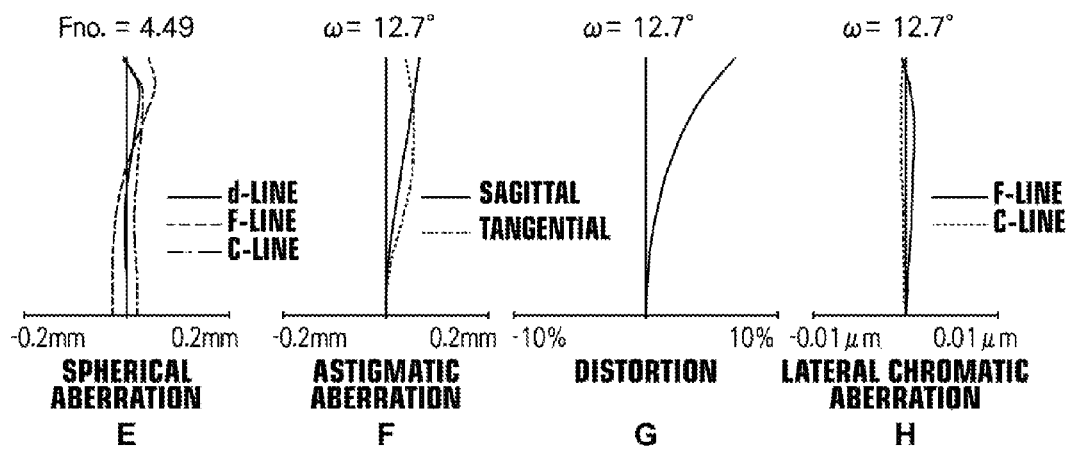
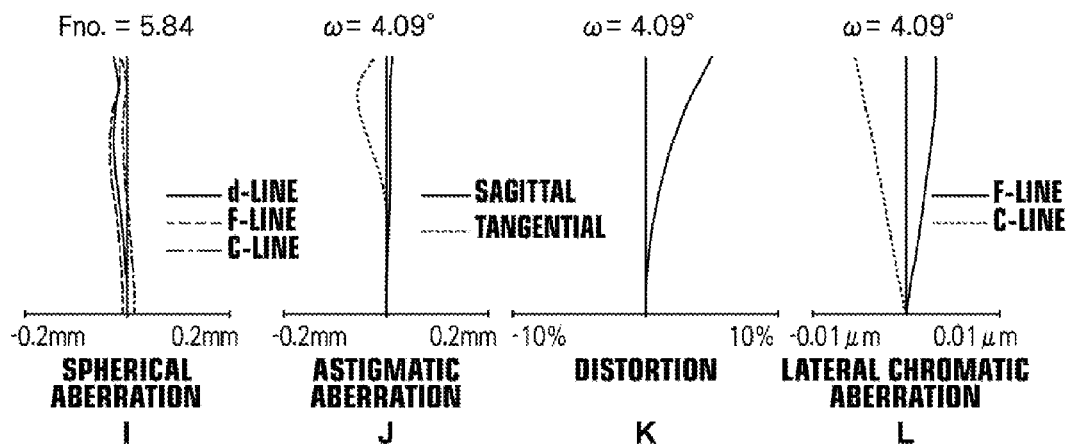

EXAMPLE 4
FIG.10
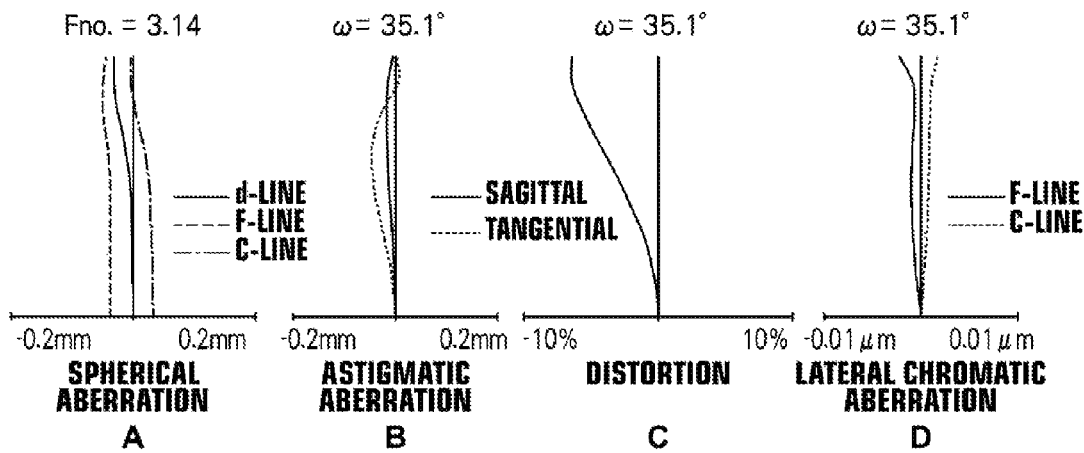
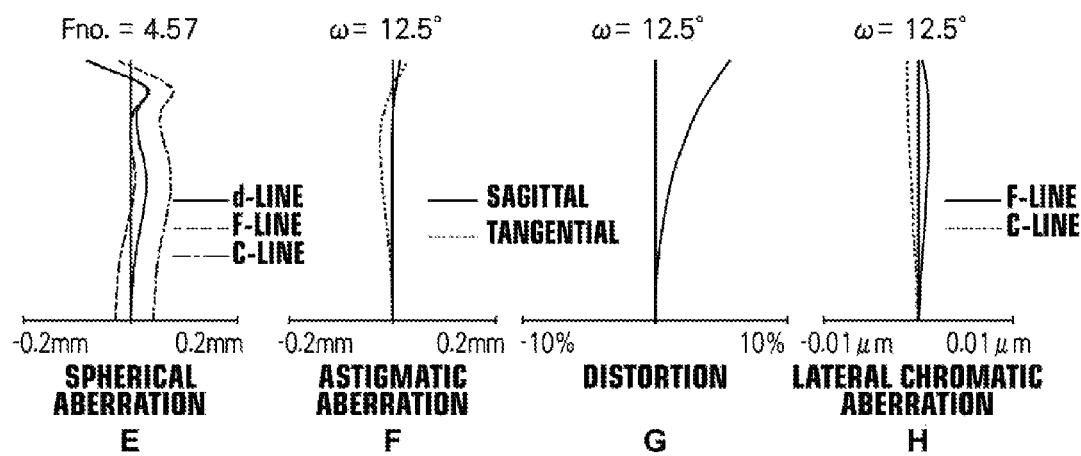
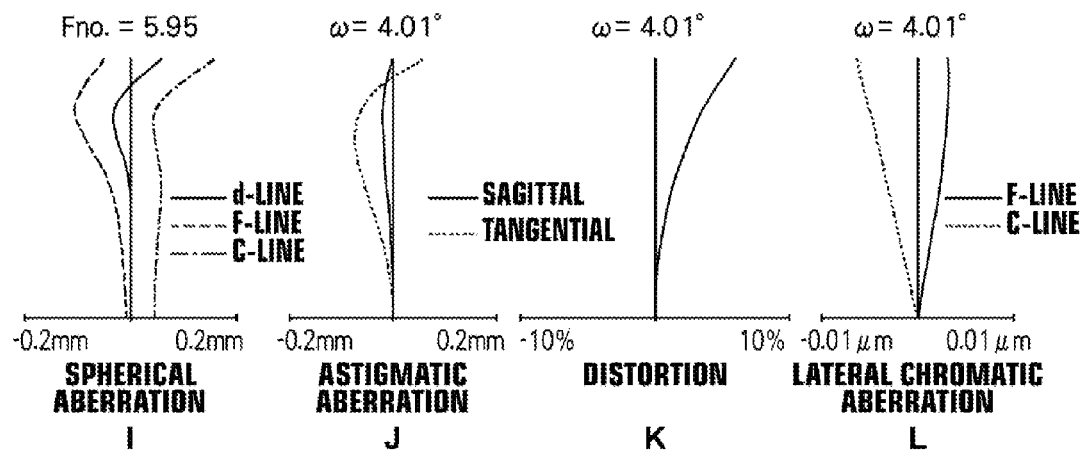

FIG.11
EXAMPLE 5
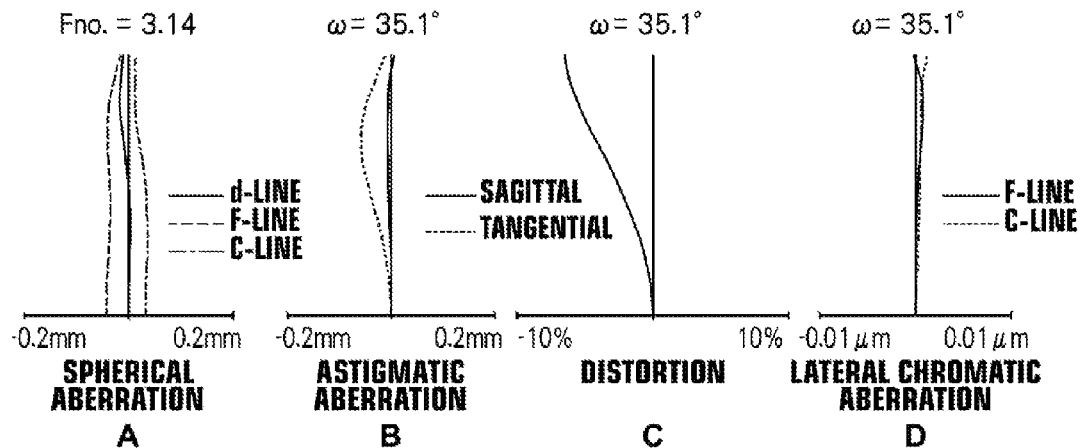
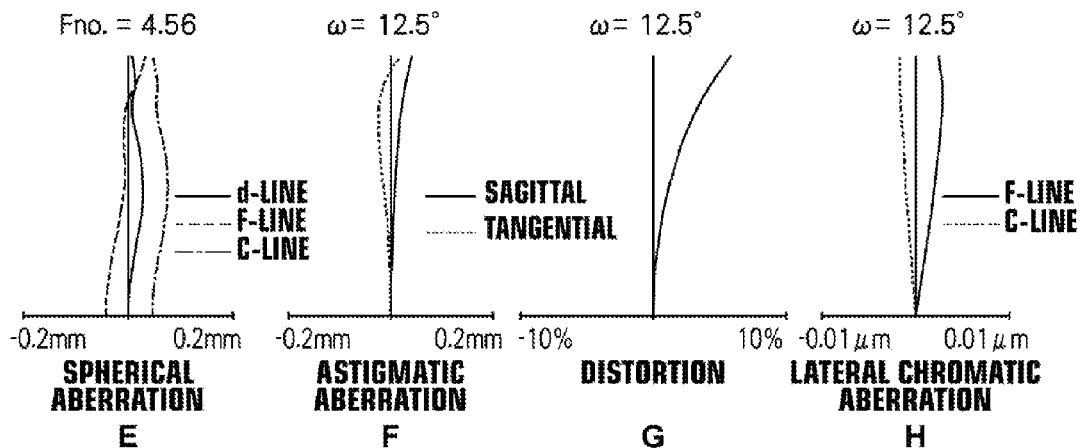
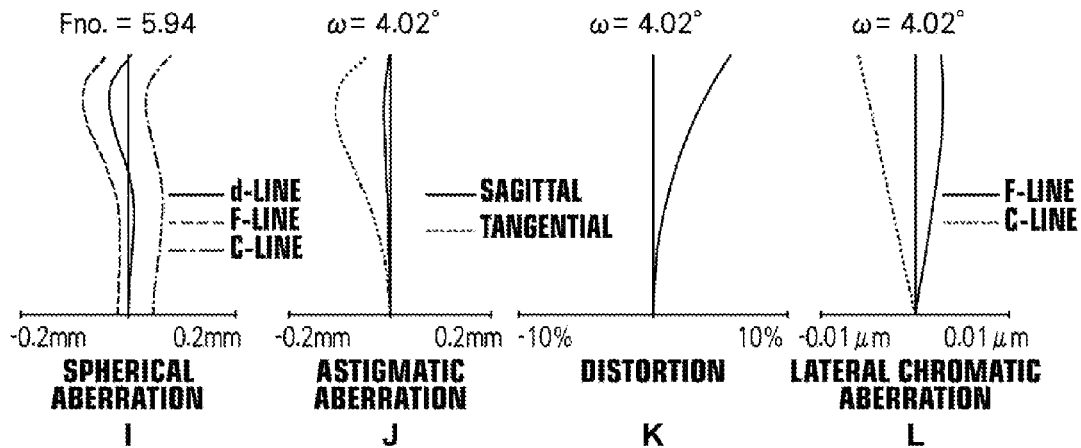

EXAMPLE 6 FIG.12
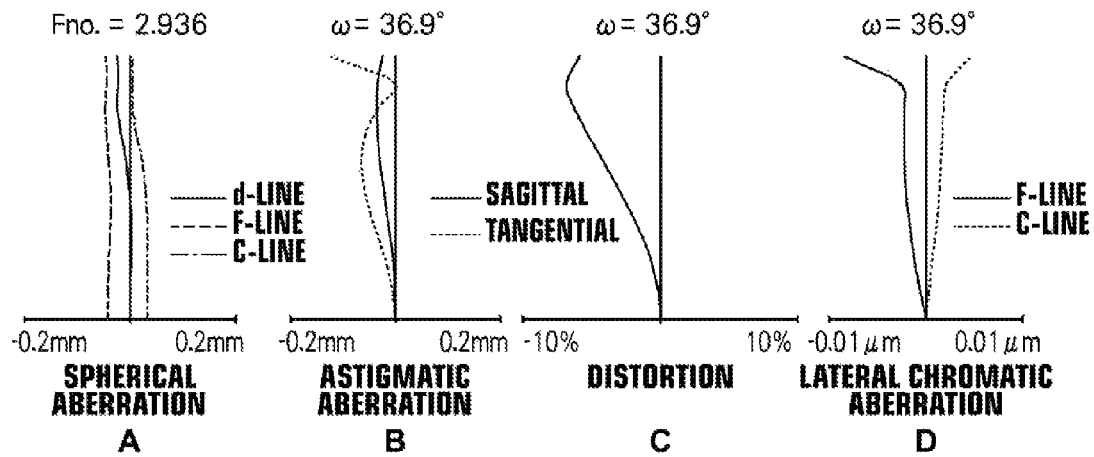
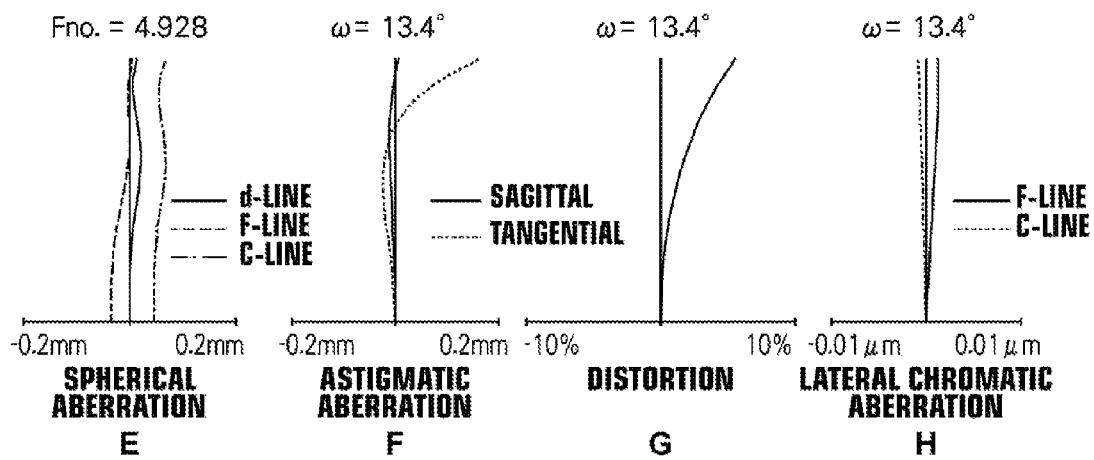
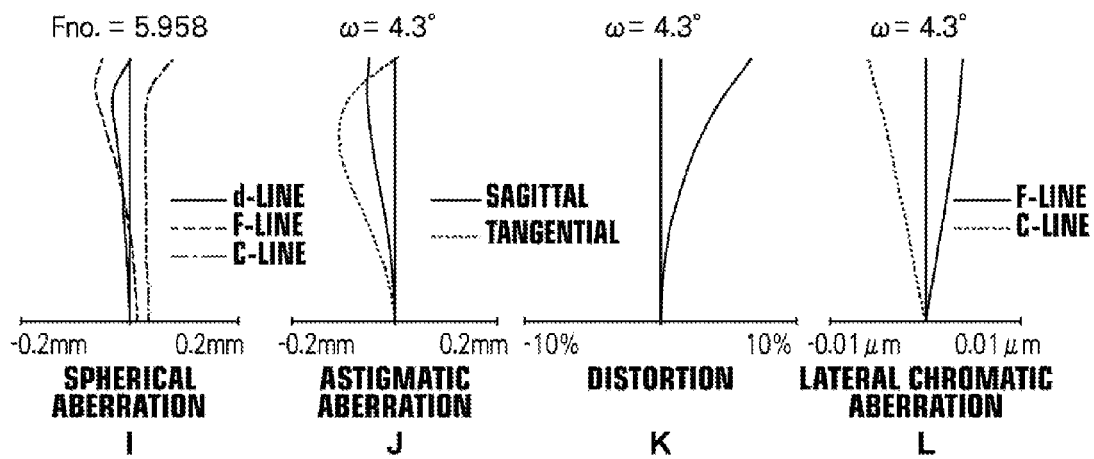

ZOOM LENS AND IMAGING APPARATUS

CROSS REFERENCE TO RELATED APPLICATIONS

This application is a continuation of PCT/JP2012/003971 filed on Jun. 19, 2012, which claims foreign priority to Japanese Application No. 2011-138434 filed on Jun. 22, 2011. The entire contents of each of the above applications are hereby incorporated by reference.

TECHNICAL FIELD

The present invention is related to a zoom lens and an imaging apparatus. Particularly, the present invention is related to a zoom lens a zoom lens having a comparatively short total length, a high angle of view, and a high variable magnification ratio, and to an imaging apparatus equipped with such a zoom lens.

BACKGROUND ART

Conventionally, zoom lenses having a first lens group having a positive refractive power, a second lens group having a negative refractive power, a third lens group having a positive refractive power, and a fourth lens group having a negative refractive power, in this order from the object side, are known as disclosed in Japanese Unexamined Patent Publication No. 4(1992)-296809, U.S. Pat. Nos. 6,449,433, and 7,423,813. Such a configuration is advantageous in shortening the total length of a zoom lens, by arranging two lens groups of the telephoto type.

DISCLOSURE OF THE INVENTION

However, the zoom lenses disclosed in Japanese Unexamined Patent Publication No. 4(1992)-296809, U.S. Pat. Nos. 6,449,433, and 7,423,813 have long total lengths, particularly at the telephoto end. In addition, the field of view at the wide angle end is insufficient, particularly in the zoom lens disclosed in Japanese Unexamined Patent Publication No. 4(1992)-296809. Further, the variable magnification ratio is insufficient in the zoom lens disclosed in U.S. Pat. No. 6,449,433. Still further, the field of view at the wide angle end and the variable magnification ratio are both insufficient in the zoom lens disclosed in U.S. Pat. No. 7,423,813.

The present invention has been developed in view of the foregoing circumstances. It is an object of the present invention to provide a zoom lens having a short total length, a sufficiently wide angle of view, and a high variable magnification ratio.

A zoom lens of the present invention practically comprises:

a first lens group having a positive refractive power;

a second lens group having a negative refractive power;

a third lens group having a positive refractive power; and a fourth lens group having a negative refractive power, provided in this order from an object side;

all of the lens groups moving along an optical axis such that the distance between the first lens group and the second lens group gradually becomes greater, the distance between the second lens group and the third lens group gradually becomes smaller, and the distance between the third lens group and the fourth lens group gradually becomes greater when changing magnification from a wide angle end to a telephoto end; and the zoom lens satisfies the following conditional formulae:

$$-2.0 < fw/f2 < -0.8 \tag{1}$$

$$-1.0 < fw/f4 < -0.2 \tag{2}$$

wherein fw is the focal length of the entire system at the wide angle end, f2 is the focal length of the second lens group, and f4 is the focal length of the fourth lens group.

Here, the expression "practically comprises a first lens group ... a second lens group ... a third lens group ... and a fourth lens group" means that the zoom lens may also include lenses that practically have any power, optical elements other than lenses such as aperture stops and cover glass, and mechanical components such as lens flanges, a lens barrel, an imaging element, a blur correcting mechanism, etc. The same applies to the expression "the fourth lens group practically comprises a lens 41 ... a lens 42 ... and a lens 43" to be described later.

Note that more desirable ranges within the ranges defined in Conditional formulae (1) and (2) are:

$$-1.05 < fw/f2 < -0.85 \tag{1}'$$

$$-0.8 < fw/f4 < -0.5 \tag{2}'$$

Note that it is preferable for the zoom lens of the present invention to satisfy the following conditional formulae:

$$-2.0 < fw/f2 < -0.8 \tag{1}$$

$$-1.0 - fw/f4 < -0.2 \tag{2}$$

wherein fw is the focal length of the entire system at the wide angle end, f2 is the focal length of the second lens group, and f4 is the focal length of the fourth lens group.

Note that more desirable ranges within the conditions defined by Conditional Formulae (1) and (2) are:

$$-1.05 < fw/f2 < -0.85 \tag{1}'$$

$$-0.8 < fw/f4 < -0.5 \tag{2}'$$

In addition, it is preferable for the zoom lens of the present invention to satisfy the following conditional formula:

$$0.6 < fw/f3 < 1.5 \tag{3}$$

wherein fw is the focal length of the entire system at the wide angle end and f3 is the focal length of the third lens group.

Note that a more desirable range within the conditions defined by Conditional Formula (3) is:

$$0.6 < fw/f3 < 1.0 \tag{3}'$$

Further, it is preferable for the zoom lens of the present invention to satisfy both of the following conditional formulae:

$$0.10 < fw/f1 < 0.18 \tag{4}$$

$$0.10 < fw/f3 < 0.80 \tag{3}''$$

wherein fw is the focal length of the entire system at the wide angle end, f1 is the focal length of the first lens group, and f3 is the focal length of the third lens group.

In the zoom lens of the present invention, it is desirable for the fourth lens group to practically comprise a lens 41 having a positive refractive power, a lens 42 having a negative refractive power, and a lens 43 having a positive refractive power, provided in this order from the object side.

In addition, it is preferable for the lens 42 and the lens 43 to be cemented together to form a cemented lens in the zoom lens of the present invention.

In the zoom lens of the present invention, it is preferable for the lens 42 to be formed by a material having a refractive index higher than the refractive indices of the materials of the lens 41 and the lens 43.

Meanwhile, an imaging apparatus comprises a zoom lens of the present invention described above.

The zoom lens according to the present invention practically comprises: the first lens group having a positive refractive power; the second lens group having a negative refractive power; the third lens group having a positive refractive power; and the fourth lens group having a negative refractive power, provided in this order from an object side. That is, two telephoto type lens groups are arranged, and therefore the total length can be shortened.

In addition, in the zoom lens according to the present invention, all of the lens groups move along an optical axis such that the distance between the first lens group and the second lens group gradually becomes greater, the distance between the second lens group and the third lens group gradually becomes smaller, and the distance between the third lens group and the fourth lens group gradually becomes greater when changing magnification from a wide angle end to a telephoto end. Therefore, correction of aberrations and amounts of movement by the lens groups can be appropriately balanced. Thereby, a wide angle of view and a high variable magnification ratio can be obtained.

Further, the zoom lens of the present invention satisfies both of Conditional Formulae (1) and (2), and therefore the following advantageous effects can be obtained. That is, Conditional Formula (1) determines the power distribution of the second lens group with respect to the entire system. If the value of fw/f2 is less than or equal to the lower limit defined in Conditional Formula (1), the refractive power of the second lens group will become excessively great, and it will become difficult to favorably correct various aberrations. Inversely, if the value of fw/f2 is greater than or equal to the upper value defined in Conditional Formula (1), the refractive power of the second lens group will become excessively small, and it will become difficult to obtain a high variable magnification ratio while maintaining a short total length. Meanwhile, Conditional Formula (2) determines the power distribution of the fourth lens group with respect to the entire system. If the value of fw/f4 is less than or equal to the lower limit defined in Conditional Formula (2), the refractive power of the fourth lens group will become excessively great, and distortion will increase from an intermediate focal length to the telephoto end. Inversely, if the value of fw/f4 is greater than or equal to the upper limit defined in Conditional formula (2), the refractive power of the fourth lens group will become excessively small, and it will become difficult to obtain a high variable magnification ratio while maintaining a short total length. The above shortcomings can be prevented in the case that Conditional Formulae (1) and (2) are satisfied.

The above advantageous effects will become more prominent in the case that Conditional Formulae (1)' and (2)' are satisfied within the ranges defined in Conditional Formulae (1) and (2).

In the zoom lens of the present invention, the following advantageous effects can be obtained particularly in the case that Conditional Formula (3) is satisfied. That is, Conditional Formula (3) determines the power distribution of the third lens group with respect to the entire system. If the value of fw/f3 is less than or equal to the lower limit defined in Conditional Formula (3), the refractive power of the third lens group will become excessively small, and it will become difficult to obtain a high variable magnification ratio while maintaining a short total length. Inversely, if the value of fw/f3 is greater than or equal to the upper value defined in Conditional Formula (3), the refractive power of the third lens group will become excessively great, and it will become difficult to favorably correct various aberrations. The above shortcomings can be prevented in the case that Conditional Formula (3) is satisfied.

The above advantageous effects will become more prominent in the case that Conditional Formula (3)' is satisfied within the range defined in Conditional Formula (3).

In addition, the following advantageous effects can be obtained in the case that the zoom lens of the present invention satisfies both Conditional Formulae (4) and (3)". That is, Conditional Formula (4) determines the power distribution of the first lens group with respect to the entire system. If the value of fw/f1 is less than or equal to the lower limit defined in Conditional Formula (4), the refractive power of the first lens group becomes excessively small, and it will become difficult to obtain a high variable magnification ratio while maintaining a short total length. Inversely, if the value of fw/f1 is greater than or equal to the upper limit defined in Conditional Formula (4), the refractive power of the first lens group will become excessively great, and it will become difficult to favorably correct various aberrations. The above shortcomings can be prevented in the case that Conditional Formula (4) is satisfied. The advantageous effects obtained by satisfying Conditional Formula (3)" are basically the same as those obtained by satisfying Conditional Formulae (3) and (3)' that similarly determine the range of the value of fw/f3. However, the advantageous effects become more prominent.

In addition, in the case that the fourth lens group practically comprises the lens 41 having a positive refractive power, the lens 42 having a negative refractive power, and the lens 43 having a positive refractive power, provided in this order from the object side, in the zoom lens of the present invention, the refractive power of the fourth lens group can be increased. Therefore, lateral chromatic aberrations and astigmatic aberrations can be favorably corrected while suppressing the total length of the zoom lens.

In addition, in the case that the lens 42 and the lens 43 are cemented together to constitute a cemented lens in the zoom lens of the present invention, peripheral rays causing total reflection can be prevented, while the refractive power of each lens can be increased, which is desirable.

In the zoom lens of the present invention, the angle of view can be widened in a simple manner in the case that the lens 42 is formed by a material having a higher refractive index than the refractive indices of the materials of the lens 41 and the lens 43.

Meanwhile, the imaging apparatus according to the present invention is equipped with the zoom lens of the present invention that exhibits the advantageous effects described above. Therefore, the lens portion of the imaging apparatus of the present invention can be miniaturized, and imaging with a wide angle of view and a high variable magnification ratio is enabled.

BRIEF DESCRIPTION OF THE DRAWINGS

FIG. 7A through L are diagrams that illustrate various aberrations of the zoom lens of the first embodiment.

FIG. 8A through L are diagrams that illustrate various aberrations of the zoom lens of the second embodiment.

FIG. 9A through L are diagrams that illustrate various aberrations of the zoom lens of the third embodiment.

FIG. 10A through L are diagrams that illustrate various aberrations of the zoom lens of the fourth embodiment.

FIG. 11A through L are diagrams that illustrate various aberrations of the zoom lens of the fifth embodiment.

FIG. 12A through L are diagrams that illustrate various aberrations of the zoom lens of the sixth embodiment.

BEST MODE FOR CARRYING OUT THE INVENTION

Figure 1:
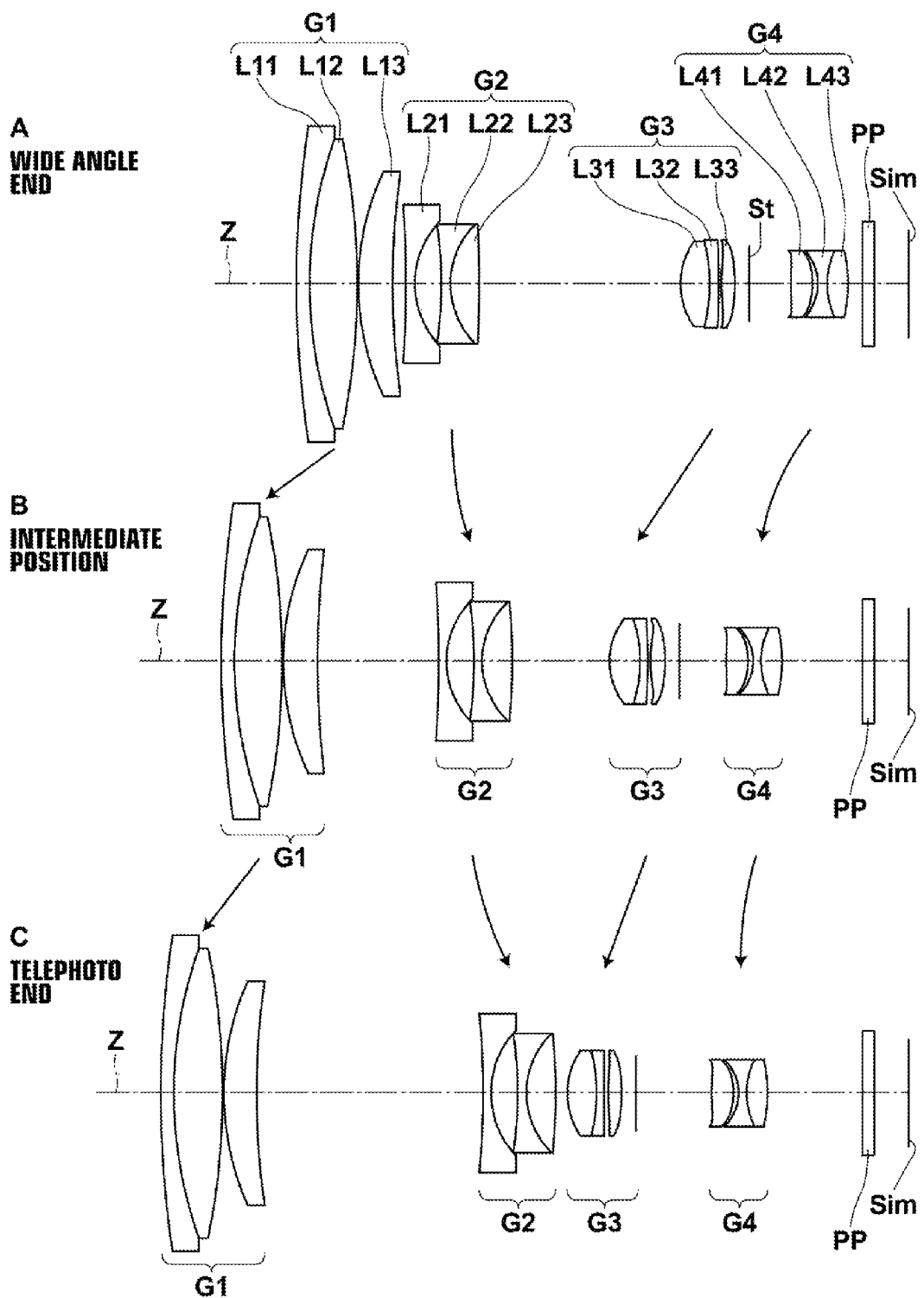
FIG. 1 is a cross sectional diagram that illustrates the lens configuration of a zoom lens according to a first embodiment of the present invention.
Figure 2:
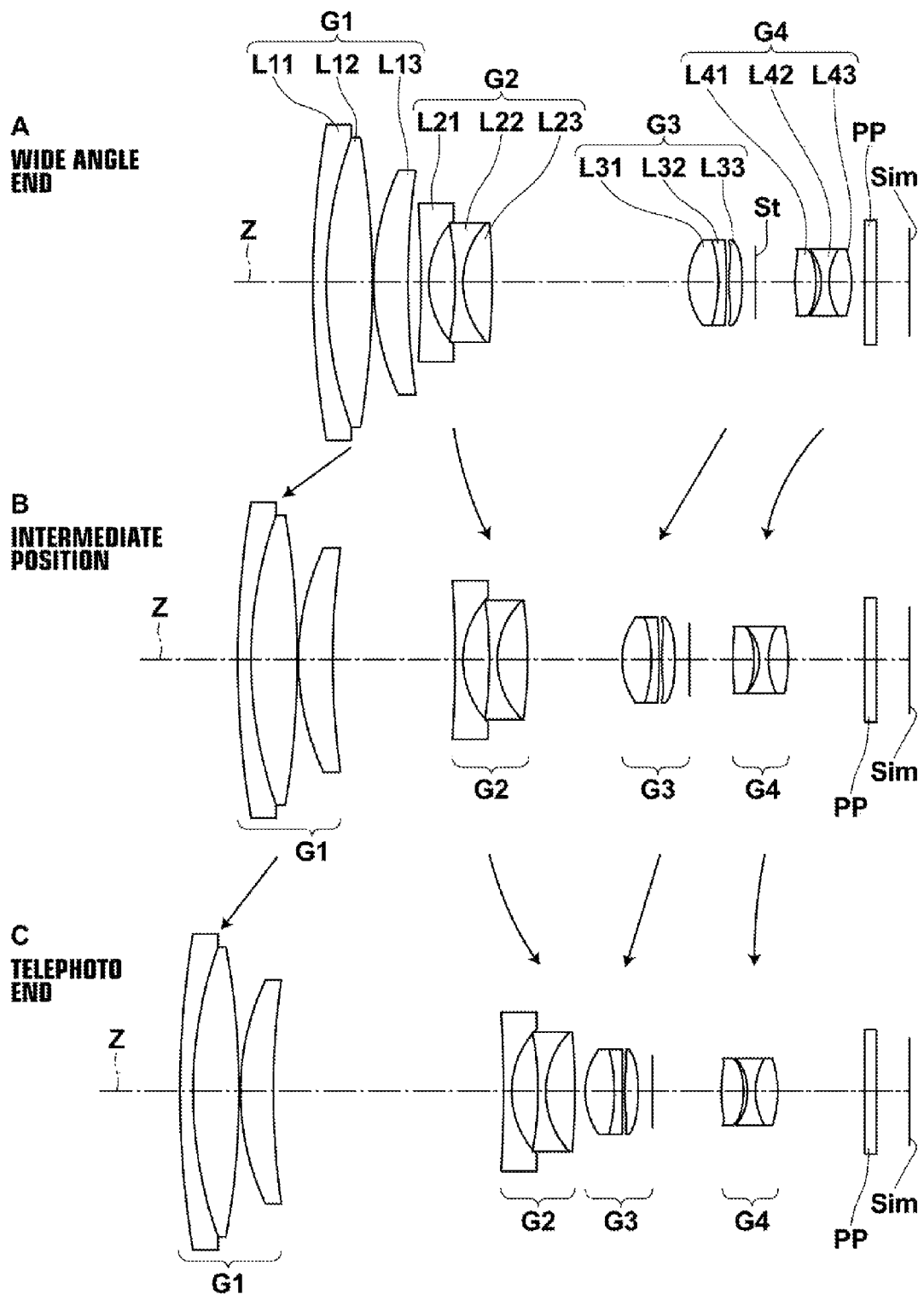
FIG. 2 is a cross sectional diagram that illustrates the lens configuration of a zoom lens according to a second embodiment of the present invention.

Hereinafter, embodiments of the present invention will be described in detail with reference to the attached drawings. FIG. 1 is a cross sectional diagram that illustrates the configuration of a zoom lens according to an embodiment of the present invention, and corresponds to a zoom lens of Example 1 to be described later. FIG. 2 through FIG. 6 are cross sectional diagrams that illustrate configurations of zoom lenses according to other embodiments of the present invention, and corresponds to zoom lenses of Examples 2 through 6 to be described later. The basic configurations of the embodiments illustrated in FIG. 1 through FIG. 11 are the same except that a third lens group G3 is constituted by two lenses in the embodiment of FIG. 3. The manners in which the configurations are illustrated are also the same. Therefore, the zoom lenses according to the embodiments of the present invention will be described mainly with reference to FIG. 1. Note that the third lens group G3 of the example illustrated in FIG. 3 will be described in detail later.

In FIG. 1, the left side is the object side and the right side is the image side. A of FIG. 1 illustrates the arrangement of the optical system in a state focused on infinity at the wide angle end (shortest focal length state). B of FIG. 1 illustrates the arrangement of the optical system focused on infinity at a position intermediate the wide angle end and the telephoto end. C of FIG. 1 illustrates the arrangement of the optical system in a state focused on infinity a state focused on infinity at the telephoto end (longest focal length state). The same applies to FIGS. 2 through 6 to be described later.

Each of the zoom lenses according to the embodiments of the present invention has a first lens group G1 having a positive refractive power, a second lens group G2 having a negative refractive power, a third lens group G3 having a positive refractive power, and a fourth lens group G4 having a negative refractive power, in this order from the object side. An aperture stop St is included in the third lens group G3. The aperture stop St illustrated in the drawings does not necessarily represent the size or shape thereof, but only the position thereof on an optical axis Z.

Note that FIG. 1 illustrates an example in which a parallel plate optical member PP is provided between the fourth lens group G4 and an imaging surface Sim. Recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In addition, when the zoom lens is applied to an imaging apparatus, it is preferable for various filters, such as a cover glass, an infrared ray cutoff filter, and a low pass filter, to be provided between the optical system and the imaging surface Sim, according to the configuration of a camera on which the lens is to be mounted. The optical member PP is provided assuming the presence of the cover glass, the various types of filters, and the like.

This zoom lens is configured such that the all of the lens groups, that is, the first lens group G1 through the fourth lens group G4, move along the optical axis Z when changing magnification. More specifically, when changing magnification from the wide angel end to the telephoto end, the first lens group G1 moves monotonously toward the object side, the second lens group G2 moves toward the side of the imaging surface Sim along a curved trajectory, third lens group G3 moves monotonously toward the object side, the aperture stop St moves integrally with the third lens group G3, and the fourth lens group G4 moves toward the object side along a curved trajectory. As a result, the distance between the first lens group G1 and the second lens group G2 gradually becomes greater, the distance between the second lens group G2 and the third lens group G3 gradually becomes smaller, and the distance between the third lens group G3 and the fourth lens group G4 gradually becomes greater.

Note that in FIG. 1, the movement trajectories of the first lens group G1 through the fourth lens group G4 when changing magnification from the wide angle end to the intermediate position are indicated by the solid arrows between A and B of FIG. 1. In addition, the movement trajectories of the first lens group G1 through the fourth lens group G4 when changing magnification from the intermediate position to the telephoto end are indicated by the solid arrows between B and C of FIG. 1. However, the movements of the lens groups are not limited to those illustrated in FIG. 1. The first lens group G1 and the third lens group G3 may move along a curved trajectory instead of the monotonous movement, and the second lens group G2 may move linearly, as long as the distance between the first lens group and the second lens group gradually becomes greater, the distance between the second lens group and the third lens group gradually becomes smaller, and the distance between the third lens group and the fourth lens group gradually becomes greater when changing magnification form the wide angle end to the telephoto end.

The first lens group G1 is constituted by a first lens L11 having a negative refractive power, a second lens L12 having a positive refractive power, and a third lens L13 having a positive refractive power, in this order from the object side. Here, the first lens L11 may be a negative meniscus lens, the second lens L12 may be a biconvex lens, and the third lens L13 may be a positive meniscus lens, as in the example illustrated in FIG. 1.

The second lens group G2 is constituted by a fourth lens 21 having a negative refractive power, a fifth lens L22 having a negative refractive power, and a sixth lens L23 having a positive refractive power, in this order from the object side. Here, the fourth lens L21 and the fifth lens L22 may be biconcave lenses, and the sixth lens L23 may be a biconvex lens, as in the example illustrated in FIG. 1.

The third lens group G3 is constituted by a seventh lens L31 having a positive refractive power, an eighth lens L32 having a negative refractive power, and a ninth lens L33 having a positive refractive power, in this order from the object side. Here, the seventh lens 31 may be a biconvex lens, the eighth lens L32 may be a negative meniscus lens, and the ninth lens L33 may be a biconvex lens as in the example illustrated in FIG. 1.

The fourth lens group G4 is constituted by a tenth lens L41 having a positive refractive power, an eleventh lens L42 having a negative refractive power, and a twelfth lens L43 having a positive refractive power, in this order from the object side. Note that the tenth lens L41, the eleventh lens 42, and the twelfth lens L42 are the previously described lens 41, lens 42, and lens 43, respectively. Here, the tenth lens L41 may be a biconvex lens, the eleventh lens L42 may be a biconcave lens, and the twelfth lens L43 may be a biconvex lens as in the example illustrated in FIG. 1.

Note that the eleventh lens L42 and the twelfth lens L43 of the fourth lens group G4 are cemented to each other to constitute a cemented lens.

Figure 3:
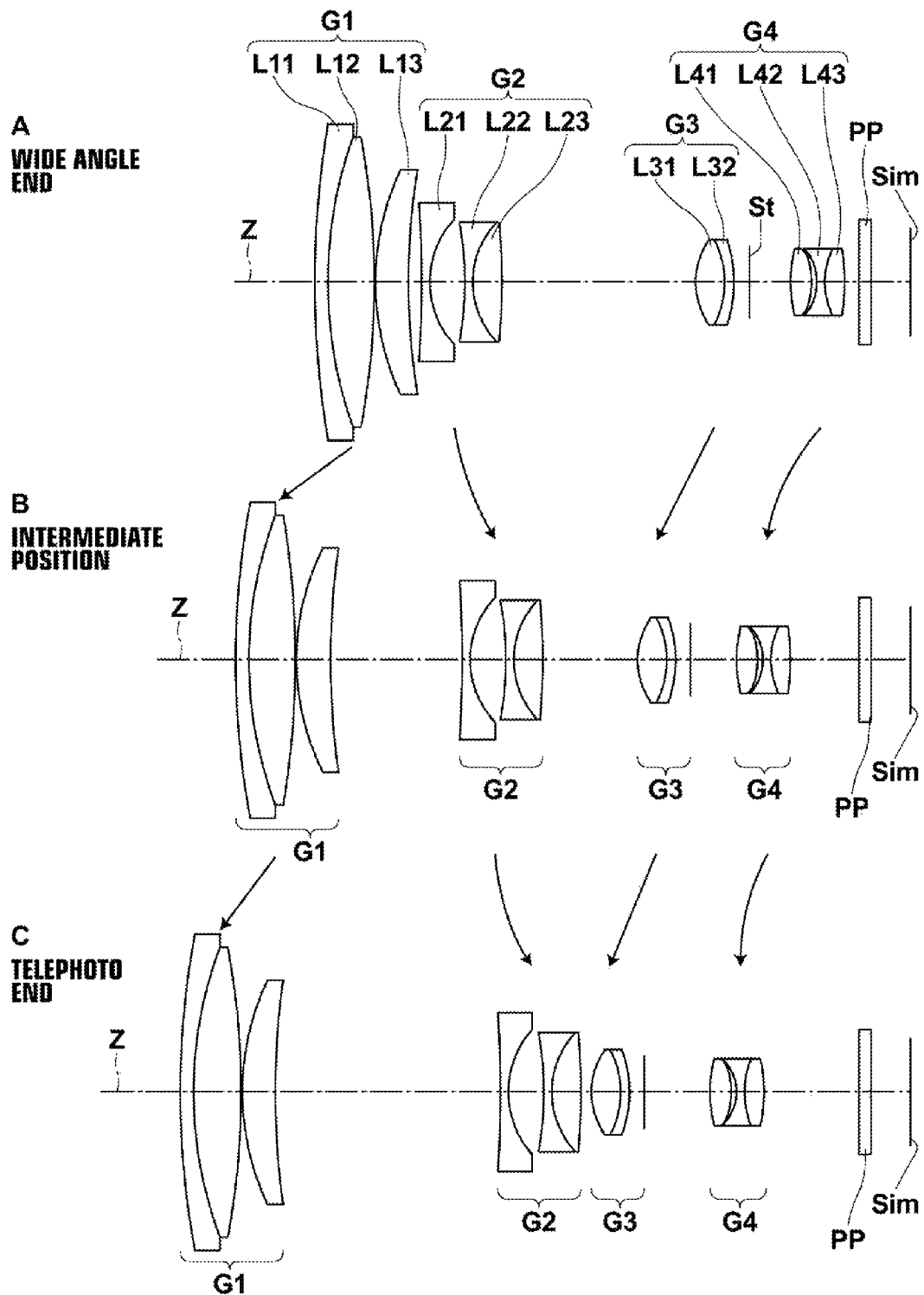
FIG. 3 is a cross sectional diagram that illustrates the lens configuration of a zoom lens according to a third embodiment of the present invention.
Figure 4:
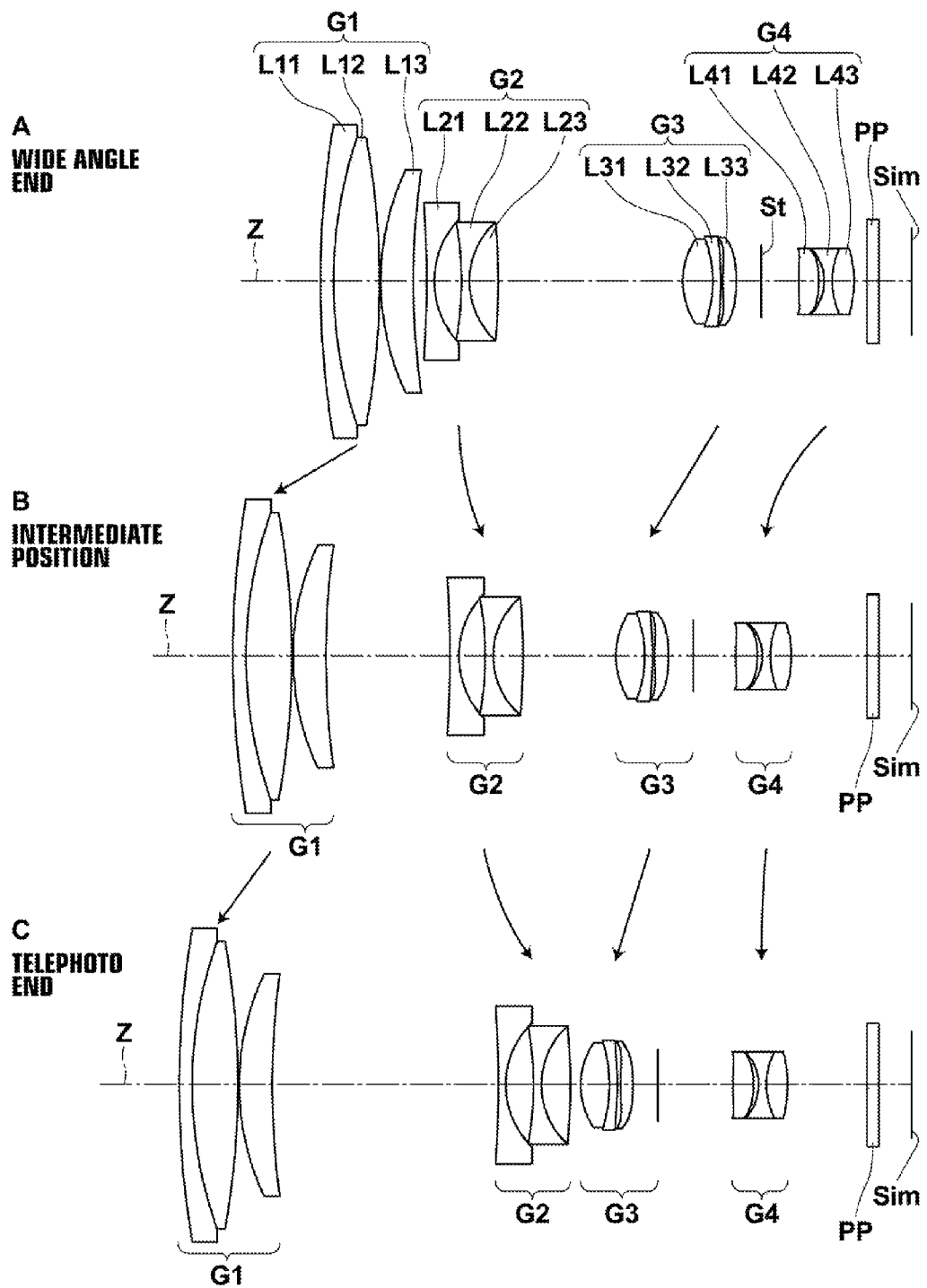
FIG. 4 is a cross sectional diagram that illustrates the lens configuration of a zoom lens according to a fourth embodiment of the present invention.
Figure 5:
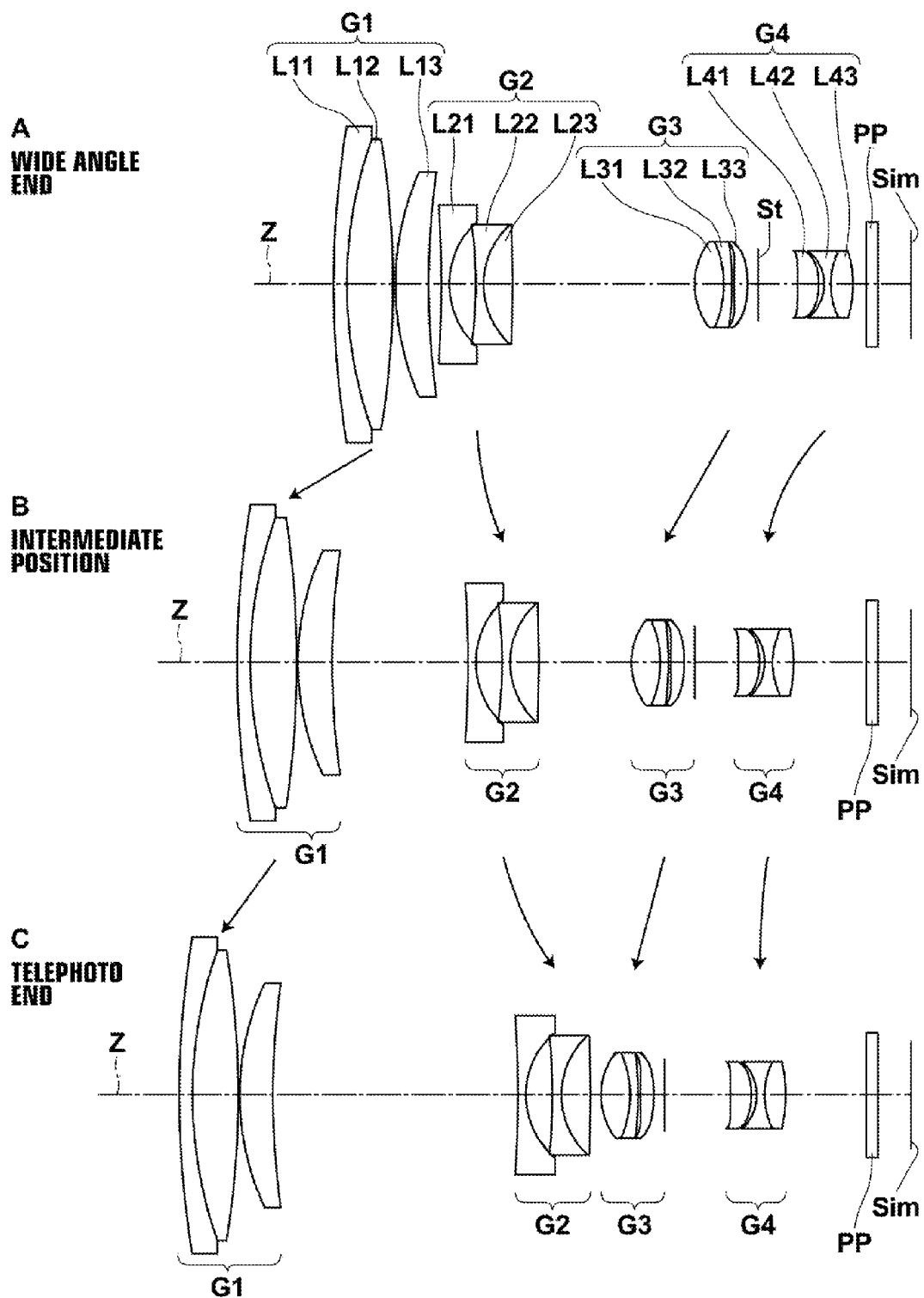
FIG. 5 is a cross sectional diagram that illustrates the lens configuration of a zoom lens according to a fifth embodiment of the present invention.
Figure 6:
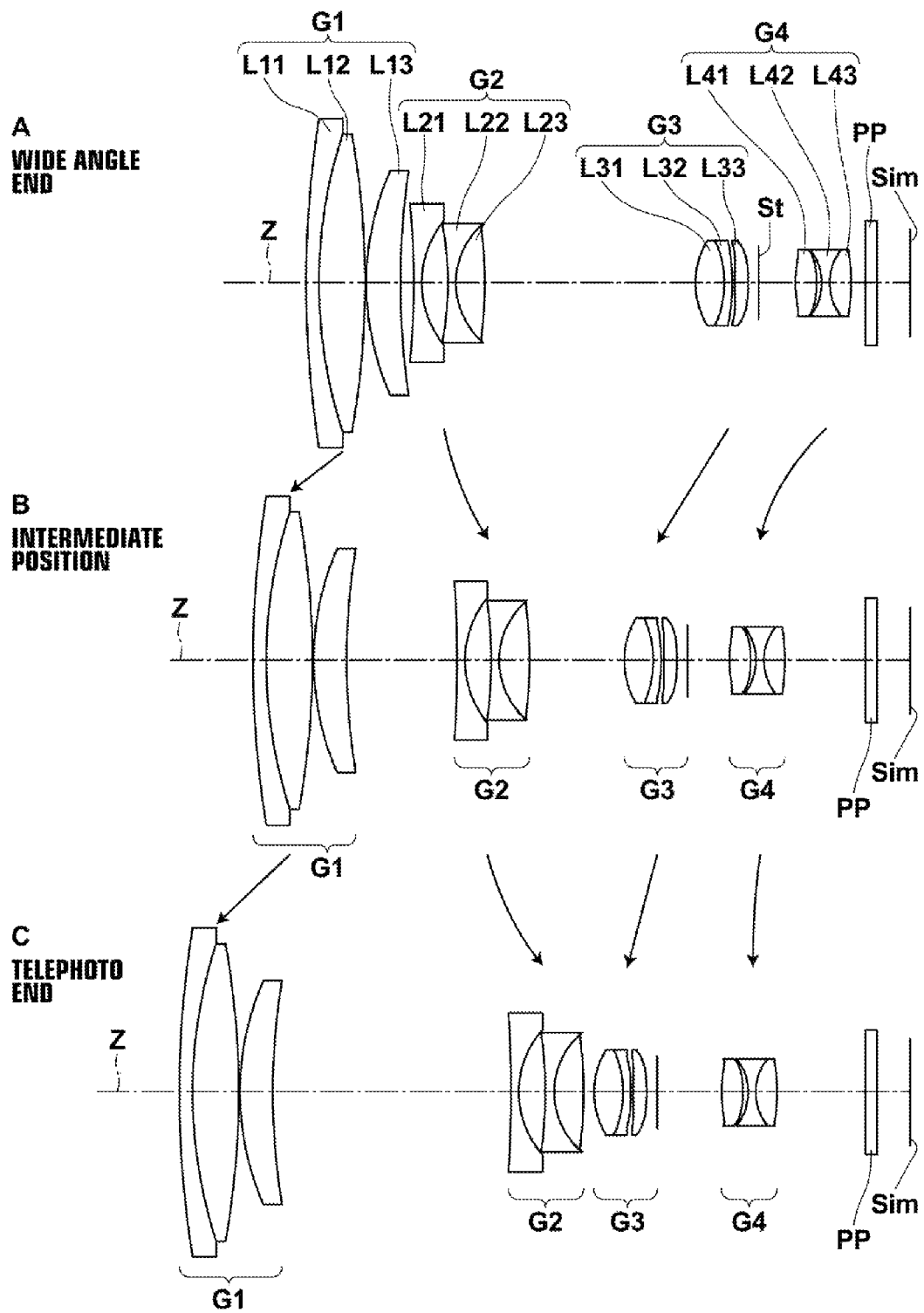
FIG. 6 is a cross sectional diagram that illustrates the lens configuration of a zoom lens according to a sixth embodiment of the present invention.

Note that the embodiment of FIG. 3 is that in which the ninth lens L33 is omitted from the third lens group G3, and is the same as the configuration described above with respect to the other structures.

The present zoom lens satisfies the conditional formulae:

$$-2.0 < fw/f2 < -0.8 \quad (1)$$

$$-1.0 < fw/f4 < -0.2 \quad (2)$$

wherein fw is the focal length of the entire system at the wide angle end, f2 is the focal length of the second lens group G2, and f4 is the focal length of the fourth lens group G4.

Note that examples of the numerical values of the embodiments will be described later with reference to Tables 1 through 19. For example, the focal distance fw of the entire system at the wide angle end of Example 1 is shown in the column "Wide Angle End" for item f in Table 2. The focal distance fw of the entire system at the wide angle end of Example 2 is shown in the same column in Table 5. The same applies to all of the Examples to be described hereinafter.

Table 19 shows the values of fw/f2 and fw/f4, which are related to Conditional Formulae (1) and (2), along with the values of fw/f3 and fw/f1, which are related to Conditional Formulae (3) and (4), for each of the Examples.

As shown in Table 19, the present zoom lens satisfies the following conditional formulae:

$$-1.05 < fw/f2 < -0.85 \quad (1)'$$

$$-0.8 < fw/f4 < -0.5 \quad (2)'$$

within the ranges defined by Conditional Formulae (1) and (2).

In addition, the present zoom lens satisfies the following conditional formula:

$$0.6 < fw/f3 < 1.5 \quad (3)$$

wherein fw is the focal length of the entire system at the wide angle end and f3 is the focal length of the third lens group G3.

In addition, the present zoom lens satisfies the following conditional formula:

$$0.6 < fw/f3 < 1.0 \quad (3)'$$

within the range defined by Conditional Formula (3).

In addition, the present zoom lens satisfies both of the following conditional formulae:

$$0.10 < fw/f1 < 0.18 \quad (4)$$

$$0.60 < fw/f3 < 0.80 \quad (3)''$$

wherein fw is the focal length of the entire system at the wide angle end, f1 is the focal length of the first lens group G1, and f3 is the focal length of the third lens group G3.

In addition, in the present zoom lens, the eleventh lens L42 is formed by a material having a refractive index higher than the refractive indices of the materials of the tenth lens L41 and the twelfth lens L43. That is, in Example 1, the refractive indices of the eleventh lens L42, the tenth lens L41, and the twelfth lens L43, are 1.88300, 1.50957, and 1.58144, respectively, for example (refer to Table 1 to be described later).

Hereinafter, the operational and advantageous effects of the present zoom lens will be described. First, the present zoom lens comprises: the first lens group G1 having a positive refractive power; the second lens group G2 having a negative refractive power; the third lens group G3 having a positive refractive power; and the fourth lens group G4 having a negative refractive power, provided in this order from an object side. That is, two telephoto type lens groups are arranged, and therefore the total length can be shortened.

In addition, in the present zoom lens, all of the lens groups move along the optical axis Z such that the distance between the first lens group G1 and the second lens group G2 gradually becomes greater, the distance between the second lens group G2 and the third lens group G3 gradually becomes smaller, and the distance between the third lens group G3 and the fourth lens group G4 gradually becomes greater when changing magnification from a wide angle end to a telephoto end. Therefore, correction of aberrations and amounts of movement by the lens groups can be appropriately balanced. Thereby, a wide angle of view and a high variable magnification ratio can be obtained.

In addition, the present zoom lens satisfies both of Conditional Formulae (1) and (2). Therefore, the following advantageous effects can be obtained. That is, Conditional Formula (1) determines the power distribution of the second lens group G2 with respect to the entire system. If the value of fw/f2 is less than or equal to the lower limit defined in Conditional Formula (1), the refractive power of the second lens group G2 will become excessively great, and it will become difficult to favorably correct various aberrations. Inversely, if the value of fw/f2 is greater than or equal to the upper value defined in Conditional Formula (1), the refractive power of the second lens group G2 will become excessively small, and it will become difficult to obtain a high variable magnification ratio while maintaining a short total length. Meanwhile, Conditional Formula (2) determines the power distribution of the fourth lens group G4 with respect to the entire system. If the value of fw/f4 is less than or equal to the lower limit defined in Conditional Formula (2), the refractive power of the fourth lens group G4 will become excessively great, and distortion will increase from an intermediate focal length to the telephoto end. Inversely, if the value of fw/f4 is greater than or equal to the upper limit defined in Conditional formula (2), the refractive power of the fourth lens group G4 will become excessively small, and it will become difficult to obtain a high variable magnification ratio while maintaining a short total length. The above shortcomings are prevented in the present zoom lens, because Conditional Formulae (1) and (2) are satisfied.

The above advantageous effects are more prominent in the present zoom lens, because Conditional Formulae (1)' and (2)' are satisfied within the ranges defined in Conditional Formulae (1) and (2).

The present zoom lens satisfies Conditional Formula (3). Therefore, the following advantageous effects can be obtained. That is, Conditional Formula (3) determines the power distribution of the third lens group G3 with respect to the entire system. If the value of fw/f3 is less than or equal to the lower limit defined in Conditional Formula (3), the refractive power of the third lens group G3 will become excessively small, and it will become difficult to obtain a high variable magnification ratio while maintaining a short total length. Inversely, if the value of fw/f3 is greater than or equal to the upper value defined in Conditional Formula (3), the refractive power of the third lens group G3 will become excessively great, and it will become difficult to favorably correct various aberrations. The present zoom lens satisfies Conditional Formula (3), and therefore the above shortcomings can be prevented.

The above advantageous effects are more prominent in the present zoom lens, because Conditional Formula (3)' is satisfied within the ranges defined in Conditional Formula (3).

In addition, the zoom lens of the present invention satisfies both of Conditional Formulae (3)" and (4). Therefore, the following advantageous effects can be obtained. That is, Conditional Formula (4) determines the power distribution of the first lens group G1 with respect to the entire system. If the value of fw/f1 is less than or equal to the lower limit defined in Conditional Formula (4), the refractive power of the first lens group G1 becomes excessively small, and it will become difficult to obtain a high variable magnification ratio while maintaining a short total length. Inversely, if the value of fw/f1 is greater than or equal to the upper limit defined in Conditional Formula (4), the refractive power of the first lens group G1 will become excessively great, and it will become difficult to favorably correct various aberrations. The present lens satisfies Conditional Formula (4), and therefore the above shortcomings can be prevented. The advantageous effects obtained by satisfying Conditional Formula (3)" are basically the same as those obtained by satisfying Conditional Formulae (3) and (3)' that similarly determine the range of the value of fw/f3. However, the advantageous effects become more prominent.

Further, in the present zoom lens, the fourth lens group G4 comprises the tenth lens L41 having a positive refractive power, the eleventh lens L42 having a negative refractive power, and the twelfth lens L43 having a positive refractive power, provided in this order from the object side. Therefore, the refractive power of the fourth lens group G4 can be increased, and lateral chromatic aberrations and astigmatic aberrations can be favorably corrected while suppressing the total length of the zoom lens.

In addition, the eleventh lens L42 and the twelfth lens L43 of the fourth lens group G4 are cemented together to constitute a cemented lens in the present zoom lens. Therefore, peripheral rays causing total reflection can be prevented, while the refractive power of each lens can be increased.

In the zoom lens of the present invention, the angle of view can be widened in a simple manner, because the eleventh lens L42 is formed by a material having a higher refractive index than the refractive indices of the materials of the tenth lens L41 and the twelfth lens L43.

Next, examples of the numerical values of the zoom lens of the present invention will be described. The cross sections of the lenses of the zoom lenses of Examples 1 through 6 are those illustrated in FIGS. 1 through 6, respectively. Regarding the zoom lens of Example 1, basic lens data are shown in Table 1, data related to zoom are shown in Table 2, and aspherical surface data are shown in Table 3. Similarly, basic lens data, data related to zoom, and aspherical surface data of the zoom lenses of Examples 2 through 6 are shown in Table 4 through Table 18. Hereinafter, the meanings of the items in the tables will be described for those related to Example 1. The same applies to the tables related to Examples 2 through 6.

In the basic lens data of Table 1, ith (i=1, 2, 3, ...) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Ri. Note that the signs of the radii of curvature are positive in cases that the surface shape is convex toward the object side, and negative in cases that the surface shape is convex toward the image side.

In the basic lens data, the item Ndj represents the refractive index of the jth (j=1, 2, 3, ...) constituent element that sequentially increases from the object side to the image side, with the lens at the most object side designated as first, with respect to the d line (wavelength: 587.6 nm). The item vdj represents the Abbe's number of the jth constituent element with respect to the d line. Note that the aperture stop St is also included in the basic lens data, and the radius of curvature of the surface corresponding to the aperture stop St is shown as "∞" (aperture stop).

D5, D10, D16, and D21 in the basic lens data of Table 1 are the distances between surfaces that change when changing magnification. D5 is the distance between the first lens group G1 and the second lens group G2, D10 is the distance between the second lens group G2 and the third lens group G3, D16 is the distance between the third lens group G3 and the fourth lens group G4, and D21 is the distance between the fourth lens group G4 and the optical member PP. Note that in Table 7 that shows data for Example 3, D14 is the distance between the third lens group G3 and the fourth lens group G4, and D19 is the distance between the fourth lens group G4 and the optical member PP. In addition, Bf represents back focus.

The data of Table 2 related to zoom shows values of the focal length (f), the F value (Fno.), and the full angle of view (2ω) of the entire system and the distances (D5, D10, D16, and D21) among surfaces that change when changing magnification at the wide angle end, at the intermediate position, and at the telephoto end. Note that in Table 8 that shows data for Example 3, the distances among surfaces that change when changing magnification are shown as D5, D10, D14, and D19.

In the lens data of Table 1, surface numbers of aspherical surfaces are denoted with the mark "*", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients K and Am (m=3, 4, 5, ..., 12) in the aspherical surface formula below:

$$Zd = C \cdot h^2 / \{1 + (1 - K \cdot C^2 \cdot h^2)^{1/2}\} + \Sigma Am \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and A and Am are aspherical surface coefficients (m=1, 2, 3, ..., 12).

The tables below show numerical values which are rounded off at a predetermined number of digits. In addition, degrees are used as the units for angles and mm are used as the units for lengths in the data of the tables below. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| 1 | 82.574161 | 1.000 | 2.00069 | 25.46 |
| 2 | 33.851722 | 3.500 | 1.59240 | 68.40 |
| 3 | −58.107266 | 0.100 | | |
| 4 | 20.719807 | 2.500 | 1.59240 | 68.40 |
| 5 | 69.281040 | D5 | | |
| 6 | −70.871893 | 0.600 | 1.88300 | 40.80 |
| 7 | 6.821939 | 2.000 | | |
| 8 | −27.934254 | 0.600 | 1.88300 | 40.80 |
| 9 | 6.279334 | 2.200 | 1.84666 | 23.78 |
| 10 | −54.898934 | D10 | | |
| 11 | 5.604211 | 2.200 | 1.51680 | 64.20 |
| 12 | −11.702347 | 0.600 | 2.00069 | 25.46 |
| 13 | −57.724423 | 0.200 | | |
| *14 | 12.320857 | 1.000 | 1.50957 | 56.36 |
| *15 | −17.201229 | 1.070 | | |
| 16 | ∞ (Aperture Stop) | D16 | | |
| *17 | 20.871946 | 1.600 | 1.50957 | 56.36 |
| *18 | −5.996654 | 0.400 | | |
| 19 | −3.508368 | 0.600 | 1.88300 | 40.80 |
| 20 | 5.502244 | 1.600 | 1.58144 | 40.89 |
| 21 | −9.893763 | D21 | | |
| 22 | ∞ | 0.900 | 1.51680 | 64.20 |
| 23 | ∞ | 2.500 (Bf) | | |

*Aspherical Surface

TABLE 2

Example 1: Data Related to Zoom

| Item | Wide Angle End | Intermediate Position | Telephoto End |
|---|---|---|---|
| f | 5.661 | 17.903 | 56.614 |
| Fno. | 2.83 | 4.54 | 5.91 |
| 2ω | 70.4 | 25.2 | 8.08 |
| D5 | 1.000 | 8.985 | 16.623 |
| D10 | 14.726 | 7.235 | 0.800 |
| D16 | 3.112 | 3.456 | 5.566 |
| D21 | 1.000 | 5.887 | 6.897 |

TABLE 3

Example 1: Aspherical Surface Coefficients

| | Surface Number | | | |
|---|---|---|---|---|
| | 14 | 15 | 17 | 18 |
| K | 1.0000 | 1.0000 | 1.0000 | 1.0000 |
| A3 | −2.0689E−03 | — | — | −7.4573E−03 |
| A4 | 3.8147E−03 | −1.6570E−03 | −2.2611E−03 | 1.0013E−02 |
| A5 | −9.2052E−03 | — | — | −2.4553E−02 |
| A6 | 7.7691E−03 | −3.7118E−05 | −7.4913E−04 | 3.7743E−02 |
| A7 | −4.0019E−03 | — | — | −4.3187E−02 |
| A8 | 1.2109E−03 | −4.9440E−06 | 2.9531E−04 | 2.8636E−02 |
| A9 | −2.0417E−04 | — | — | −9.6849E−03 |
| A10 | 1.4526E−05 | −1.2738E−08 | −5.0926E−05 | 1.2812E−03 |

TABLE 4

Example 2: Basic Lens Data

| Si (Surface Number) | Ri (Radius of Curvature) | Di (Distance) | Ndj (Refractive Index) | vdj (Abbe's Number) |
|---|---|---|---|---|
| 1 | 74.523984 | 1.000 | 2.00069 | 25.46 |
| 2 | 33.050228 | 3.500 | 1.59240 | 68.40 |
| 3 | −62.707217 | 0.100 | | |
| 4 | 20.270980 | 2.500 | 1.59240 | 68.40 |
| 5 | 58.159046 | D5 | | |
| 6 | −82.092241 | 0.600 | 1.88300 | 40.80 |
| 7 | 6.736333 | 2.000 | | |
| 8 | −26.721744 | 0.600 | 1.88300 | 40.80 |
| 9 | 6.437753 | 2.200 | 1.84666 | 23.78 |
| 10 | −48.074437 | D10 | | |
| 11 | 5.551186 | 2.200 | 1.51680 | 64.20 |
| 12 | −11.596110 | 0.600 | 2.00069 | 25.46 |
| 13 | −57.062529 | 0.200 | | |
| *14 | 13.187360 | 1.000 | 1.50957 | 56.36 |
| *15 | −16.278102 | 1.068 | | |
| 16 | ∞ (Aperture Stop) | D16 | | |
| *17 | 14.196261 | 1.600 | 1.50957 | 56.36 |
| *18 | −7.442067 | 0.400 | | |
| 19 | −3.619089 | 0.600 | 1.88300 | 40.80 |
| 20 | 5.397045 | 1.600 | 1.58144 | 40.89 |
| 21 | −9.878848 | D21 | | |
| 22 | ∞ | 0.900 | 1.51680 | 64.20 |
| 23 | ∞ | 2.500 (Bf) | | |

*Aspherical Surface

TABLE 5

Example 2: Data Related to Zoom

| Item | Wide Angle End | Intermediate Position | Telephoto End |
|---|---|---|---|
| f | 5.582 | 17.653 | 55.824 |
| Fno. | 3.08 | 4.48 | 5.83 |
| 2ω | 71.2 | 25.6 | 8.2 |
| D5 | 1.000 | 9.285 | 17.341 |
| D10 | 14.860 | 7.208 | 0.800 |
| D16 | 2.976 | 3.322 | 5.200 |
| D21 | 1.000 | 5.706 | 6.545 |

TABLE 6

Example 2: Aspherical Surface Coefficients

| | Surface Number | | | |
|---|---|---|---|---|
| | 14 | 15 | 17 | 18 |
| K | 1.0000 | 1.0000 | 1.0000 | 1.0000 |
| A4 | −2.6711E−03 | −2.0109E−03 | −1.8826E−03 | −4.6163E−03 |
| A6 | −8.0942E−05 | −5.3296E−05 | −4.0225E−04 | −6.7027E−04 |
| A8 | −9.8763E−06 | −6.1076E−06 | 1.6106E−04 | 2.5131E−04 |
| A10 | 2.4835E−08 | −1.4527E−08 | −2.3690E−05 | −4.0598E−05 |

TABLE 7

Example 3: Basic Lens Data

| Si (Surface Number) | Ri (Radius of Curvature) | Di (Distance) | Ndj (Refractive Index) | vdj (Abbe's Number) |
|---|---|---|---|---|
| 1 | 69.481090 | 1.000 | 2.00069 | 25.46 |
| 2 | 32.569060 | 3.500 | 1.59240 | 68.40 |
| 3 | −64.765941 | 0.100 | | |

TABLE 7-continued

Example 3: Basic Lens Data

| Si (Surface Number) | Ri (Radius of Curvature) | Di (Distance) | Ndj (Refractive Index) | vdj (Abbe's Number) |
|---|---|---|---|---|
| 4 | 19.794520 | 2.500 | 1.59240 | 68.40 |
| 5 | 55.026576 | D5 | | |
| 6 | −98.921349 | 0.600 | 1.88300 | 40.80 |
| 7 | 6.932365 | 2.690 | | |
| 8 | −24.865861 | 0.600 | 1.88300 | 40.80 |
| 9 | 6.542884 | 2.200 | 1.84666 | 23.78 |
| 10 | −50.294642 | D10 | | |
| 11* | 5.035184 | 2.200 | 1.49700 | 81.36 |
| 12 | −6.706341 | 0.700 | 2.00069 | 25.46 |
| 13 | −9.319617 | 1.102 | | |
| 14 | ∞ (Aperture Stop) | D14 | | |
| 15* | 9.142787 | 1.600 | 1.50957 | 56.36 |
| 16* | −6.59822 | 0.400 | | |
| 17 | −3.543152 | 0.600 | 1.88300 | 40.80 |
| 18 | 5.800275 | 1.500 | 1.58144 | 40.89 |
| 19 | −14.648650 | D19 | | |
| 20 | ∞ | 0.900 | 1.51680 | 64.20 |
| 21 | ∞ | 3.000 (Bf) | | |

*Aspherical Surface

TABLE 8

Example 3: Data Related to Zoom

| Item | Wide Angle End | Intermediate Position | Telephoto End |
|---|---|---|---|
| f | 5.593 | 17.687 | 55.932 |
| Fno. | 3.08 | 4.49 | 5.84 |
| 2ω | 71.2 | 25.4 | 8.18 |
| D5 | 1.000 | 9.965 | 17.015 |
| D10 | 14.597 | 7.158 | 0.800 |
| D14 | 3.120 | 3.430 | 4.878 |
| D19 | 1.092 | 5.166 | 7.149 |

TABLE 9

Example 3: Aspherical Surface Coefficients

| | Surface Number | | |
|---|---|---|---|
| | 11 | 15 | 16 |
| K | 1.0000 | 1.0000 | 1.0000 |
| A4 | −1.0071E−03 | −7.7010E−05 | −2.4944E−03 |
| A6 | −1.7854E−05 | −4.4050E−04 | −9.7573E−04 |
| A8 | −1.5312E−06 | 1.8921E−04 | 4.2773E−04 |
| A10 | 3.7732E−08 | −2.2850E−05 | −6.0655E−05 |

TABLE 10

Example 4: Basic Lens Data

| Si (Surface Number) | Ri (Radius of Curvature) | Di (Distance) | Ndj (Refractive Index) | vdj (Abbe's Number) |
|---|---|---|---|---|
| 1 | 73.028405 | 1.000 | 2.00069 | 25.46 |
| 2 | 33.121364 | 3.500 | 1.59240 | 68.40 |
| 3 | −62.361005 | 0.100 | | |
| 4 | 20.071570 | 2.500 | 1.59240 | 68.40 |
| 5 | 59.348820 | D5 | | |
| 6 | −75.253036 | 0.600 | 1.88300 | 40.80 |
| 7 | 6.680597 | 2.071 | | |
| 8 | −25.061533 | 0.600 | 1.88300 | 40.80 |
| 9 | 6.061330 | 2.200 | 1.84666 | 23.78 |
| 10 | −56.426907 | D10 | | |
| 11 | 5.861177 | 2.200 | 1.51680 | 64.20 |
| 12 | −9.626489 | 0.600 | 2.00069 | 25.46 |
| 13 | −28.796869 | 0.200 | | |
| *14 | 20.860609 | 1.000 | 1.50957 | 56.36 |
| *15 | −12.991012 | 1.883 | | |
| 16 | ∞ (Aperture Stop) | D16 | | |
| *17 | 19.664396 | 1.600 | 1.50957 | 56.36 |
| *18 | −6.743663 | 0.400 | | |
| 19 | −3.569211 | 0.600 | 1.88300 | 40.80 |
| 20 | 6.069590 | 1.600 | 1.59551 | 39.22 |
| 21 | −8.822736 | D21 | | |
| 22 | ∞ | 0.900 | 1.51680 | 64.20 |
| 23 | ∞ | 2.500 (Bf) | | |

*Aspherical Surface

TABLE 11

Example 4: Data Related to Zoom

| Item | Wide Angle End | Intermediate Position | Telephoto End |
|---|---|---|---|
| f | 5.700 | 18.025 | 57.000 |
| Fno. | 3.14 | 4.57 | 5.95 |
| 2ω | 70.2 | 25.0 | 8.02 |
| D5 | 1.000 | 9.483 | 17.190 |
| D10 | 14.051 | 7.069 | 0.800 |
| D16 | 2.858 | 3.243 | 5.645 |
| D21 | 1.000 | 5.791 | 5.967 |

TABLE 12

Example 4: Aspherical Surface Coefficients

| | Surface Number | | | |
|---|---|---|---|---|
| | 14 | 15 | 17 | 18 |
| K | 1.0000 | 1.0000 | 1.0000 | 1.0000 |
| A4 | −2.7283E−03 | −2.1122E−03 | −2.7233E−03 | −5.7286E−03 |
| A6 | −1.3714E−04 | −9.7241E−05 | −2.7323E−04 | −4.1494E−04 |
| A8 | 1.0859E−06 | 1.5598E−06 | 1.3839E−04 | 1.8439E−04 |
| A10 | −6.7908E−07 | −4.9997E−07 | −2.7859E−05 | −3.6551E−05 |

TABLE 13

Example 5: Basic Lens Data

| Si (Surface Number) | Ri (Radius of Curvature) | Di (Distance) | Ndj (Refractive Index) | vdj (Abbe's Number) |
|---|---|---|---|---|
| 1 | 71.869450 | 1.000 | 2.00069 | 25.46 |
| 2 | 32.948799 | 3.500 | 1.59240 | 68.40 |
| 3 | −68.211814 | 0.100 | | |
| 4 | 20.559494 | 2.500 | 1.59240 | 68.40 |
| 5 | 56.240868 | D5 | | |
| 6 | −79.805880 | 0.600 | 1.81600 | 46.57 |
| 7 | 6.302445 | 2.000 | | |
| 8 | −34.357275 | 0.600 | 1.88300 | 40.80 |
| 9 | 6.186877 | 2.200 | 1.84666 | 23.78 |
| 10 | −142.743023 | D10 | | |
| 11 | 5.149811 | 2.200 | 1.51823 | 58.96 |

TABLE 13-continued

Example 5: Basic Lens Data

| Si (Surface Number) | Ri (Radius of Curvature) | Di (Distance) | Ndj (Refractive Index) | vdj (Abbe's Number) |
|---|---|---|---|---|
| 12 | −8.212405 | 0.600 | 2.00069 | 25.46 |
| 13 | −27.729317 | 0.200 | | |
| *14 | 19.570955 | 1.000 | 1.50957 | 56.36 |
| *15 | −10.367415 | 0.800 | | |
| 16 | ∞ (Aperture Stop) | D16 | | |
| *17 | 138.106936 | 1.600 | 1.50957 | 56.36 |
| *18 | −5.657980 | 0.400 | | |
| 19 | −3.311469 | 0.600 | 1.88300 | 40.80 |
| 20 | 5.778462 | 1.600 | 1.61293 | 36.96 |
| 21 | −9.492001 | D21 | | |
| 22 | ∞ | 0.900 | 1.51680 | 64.20 |
| 23 | ∞ | 2.500 (Bf) | | |

*Aspherical Surface

TABLE 14

Example 5: Data Related to Zoom

| Item | Wide Angle End | Intermediate Position | Telephoto End |
|---|---|---|---|
| f | 5.689 | 17.989 | 56.886 |
| Fno. | 3.14 | 4.56 | 5.94 |
| 2ω | 70.2 | 25.0 | 8.04 |
| D5 | 1.000 | 10.255 | 18.519 |
| D10 | 13.676 | 6.945 | 0.800 |
| D16 | 2.939 | 3.245 | 4.941 |
| D21 | 1.000 | 5.466 | 6.011 |

TABLE 15

Example 5: Aspherical Surface Coefficients

| | Surface Number | | | |
|---|---|---|---|---|
| | 14 | 15 | 17 | 18 |
| K | 1.0000 | 1.0000 | 1.0000 | 1.0000 |
| A4 | −3.8405E−03 | −2.8694E−03 | −2.9115E−03 | −5.2690E−03 |
| A6 | −1.3958E−04 | −7.2667E−05 | −5.0751E−04 | −7.2145E−04 |
| A8 | −7.6842E−06 | −4.8401E−06 | 2.5973E−04 | 3.0111E−04 |
| A10 | −4.9320E−07 | −3.8090E−07 | −4.5429E−05 | −5.2736E−05 |

TABLE 16

Example 6: Basic Lens Data

| Si (Surface Number) | Ri (Radius of Curvature) | Di (Distance) | Ndj (Refractive Index) | vdj (Abbe's Number) |
|---|---|---|---|---|
| 1 | 83.622488 | 1.000 | 2.00069 | 25.46 |
| 2 | 36.494800 | 3.500 | 1.59240 | 68.40 |
| 3 | −62.182033 | 0.100 | | |
| 4 | 21.281442 | 2.500 | 1.59240 | 68.40 |
| 5 | 58.121861 | D5 | | |
| 6 | −85.099880 | 0.600 | 1.81600 | 46.57 |
| 7 | 7.314359 | 2.002 | | |
| 8 | −27.081750 | 0.600 | 1.88300 | 40.80 |
| 9 | 5.882316 | 2.200 | 1.80518 | 25.46 |
| 10 | −36.680210 | D10 | | |
| 11 | 5.909209 | 2.200 | 1.51823 | 58.96 |
| 12 | −7.654065 | 0.600 | 2.00069 | 25.46 |
| 13 | −15.150038 | 0.200 | | |
| *14 | 29.784986 | 1.000 | 1.50957 | 56.36 |
| *15 | −15.391312 | 0.802 | | |
| 16 | ∞ (Aperture Stop) | D16 | | |
| *17 | 10.456710 | 1.600 | 1.50957 | 56.36 |
| *18 | −8.493869 | 0.400 | | |
| 19 | −3.969446 | 0.600 | 1.88300 | 40.80 |
| 20 | 3.952503 | 1.600 | 1.59551 | 39.22 |
| 21 | −15.028599 | D21 | | |
| 22 | ∞ | 0.900 | 1.51680 | 64.20 |
| 23 | ∞ | 2.500 (Bf) | | |

*Aspherical Surface

TABLE 17

Example 6: Data Related to Zoom

| Item | Wide Angle End | Intermediate Position | Telephoto End |
|---|---|---|---|
| f | 5.326 | 16.842 | 53.260 |
| Fno. | 2.936 | 4.928 | 5.958 |
| 2ω | 73.8 | 26.8 | 8.6 |
| D5 | 1.000 | 8.309 | 17.969 |
| D10 | 15.885 | 7.172 | 0.800 |
| D16 | 2.786 | 3.153 | 4.832 |
| D21 | 1.000 | 6.029 | 6.626 |

TABLE 18

Example 6: Aspherical Surface Coefficients

| | Surface Number | | | |
|---|---|---|---|---|
| | 14 | 15 | 17 | 18 |
| K | 1.0000 | 1.0000 | 1.0000 | 1.0000 |
| A4 | −3.8405E−03 | −2.8694E−03 | −2.9115E−03 | −5.2690E−03 |
| A6 | −1.3958E−04 | −7.2667E−05 | −5.0751E−04 | −7.2145E−04 |
| A8 | −7.6842E−06 | −4.8401E−06 | 2.5973E−04 | 3.0111E−04 |
| A10 | −4.9320E−07 | −3.8090E−07 | −4.5429E−05 | −5.2736E−05 |

Table 19 shows values corresponding to Conditional Formulae (1) through (4) of the zoom lenses of Examples 1 through 6. The values in Table 19 are related to the d line.

TABLE 19

Values Related to Conditional Formulae

| | Example 1 | Example 2 | Example 3 | Example 4 | Example 5 | Example 6 |
|---|---|---|---|---|---|---|
| (1) fw/f2 | −0.944 | −0.919 | −0.925 | −0.994 | −0.977 | −0.832 |
| (2) fw/f4 | −0.638 | −0.612 | −0.555 | −0.568 | −0.744 | −0.641 |
| (3) fw/f3 | 0.726 | 0.715 | 0.699 | 0.715 | 0.792 | 0.690 |
| (4) fw/f1 | 0.174 | 0.167 | 0.171 | 0.176 | 0.165 | 0.151 |

The spherical aberration, the astigmatic aberration, the distortion, and the lateral chromatic aberration of the zoom lens of Example 1 at the wide angle end are illustrated in A through D of FIG. 7, respectively. The spherical aberration, the astigmatic aberration, the distortion, and the lateral chromatic aberration of the zoom lens of Example 1 at the intermediate position are illustrated in E through H of FIG. 7, respectively. The spherical aberration, the astigmatic aberration, the distortion, and the lateral chromatic aberration of the zoom lens of Example 1 at the telephoto end are illustrated in I through L of FIG. 7, respectively.

Each of the diagrams that illustrate the aberrations use the d line (wavelength: 587.6 nm) as a standard. However, in the diagrams that illustrate spherical aberration, aberrations related to wavelengths of 460.0 nm and 615.0 nm are also shown. In addition, the diagrams that illustrate lateral chromatic aberration also show aberrations related to wavelengths of 460.0 nm and 615.0 nm. In the diagrams that illustrate astigmatic aberrations, aberrations in the sagittal direction are indicated by solid lines, while aberrations in the tangential direction are indicated by broken lines. In the diagrams that illustrate spherical aberrations, "Fno." denotes F values. In the other diagrams that illustrate the aberrations, ω denotes half angles of view.

Similarly, the aberrations of the zoom lens of Example 2 are illustrated in A through L of FIG. 8. In addition, the aberrations of the zoom lenses of Examples 3 through 11 are illustrated in FIG. 9 through FIG. 12.

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Figure 13:
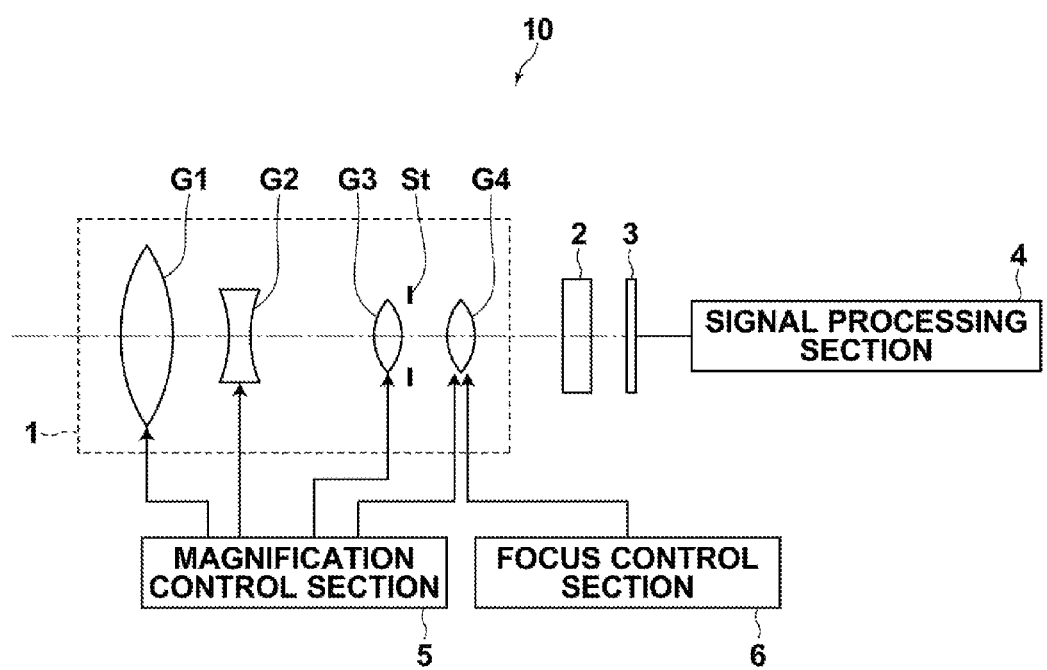
FIG. 13 is a diagram that schematically illustrates an imaging apparatus according to an embodiment of the present invention.

Next, an imaging apparatus according to an embodiment of the present invention will be described. FIG. 13 is a diagram that schematically illustrates an imaging apparatus 10 according to the embodiment of the present invention that employs the zoom lens 1 of the embodiment of the present invention. The imaging apparatus may be a surveillance camera, a video camera, an electronic still camera, or the like.

The imaging apparatus 10 illustrated in FIG. 13 is equipped with: the zoom lens 1; a filter 2 provided toward the image side of the zoom lens 1; an imaging element 3 that captures images of subjects focused by the zoom lens 1; a signal processing section 4 that processes signals output from the imaging element 2; a magnification control section 5 that changes the magnification of the zoom lens 1; and a focus control section 6 that performs focus adjustments.

The zoom lens 1 comprises the first lens group G1 having a positive refractive power, the second lens group G2 having the negative refractive power, the third lens group G3 having the positive refractive power, and the fourth lens group G4 having the negative refractive power. In the zoom lens 1, all of the lens group move along the optical axis Z when changing magnification from the wide angle end to the telephoto end such that the distance between the first lens group G1 and the second lens group G2 gradually becomes greater, the distance between the second lens group G2 and the third lens group G3 gradually becomes smaller, and the distance between the third lens group G3 and the fourth lens group G4 gradually becomes greater. Note that the lens groups are schematically illustrated in FIG. 13.

The imaging element 3 captures an optical image formed by the zoom lens 1 and outputs electrical signals. The imaging surface thereof is provided to match the imaging plane of the zoom lens 1. A CCD, a CMOS, or the like may be employed as the imaging element 3.

The imaging apparatus is equipped with the zoom lens 1 according to the present invention. Therefore, the lens portion thereof can be miniaturized, and imaging becomes possible with a wide angle of view and a high variable magnification ratio.

Note that although not illustrated in FIG. 13, the imaging apparatus 10 may be further equipped with a blur correcting mechanism that moves a lens having a positive refractive power that constitutes a portion of the second lens group G3 or the entire third lens group G3 in a direction perpendicular to the optical axis Z in order to correct blurring of obtained images due to vibration or shaky hands. In addition, the lens group to be moved is not limited to the third lens group. The entirety or a portion of another lens group may be moved in a direction perpendicular to the optical axis Z to correct blurring of obtained images due to vibration or shaky hands. As a further alternative, the imaging element 3 may be moved instead of a lens.

The present invention has been described with reference to the embodiments and Examples thereof. However, the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

What is claimed is:

1. A zoom lens, comprising:
   a first lens group having a positive refractive power;
   a second lens group having a negative refractive power;
   a third lens group having a positive refractive power; and
   a fourth lens group having a negative refractive power, provided in this order from an object side,
   all of the lens groups moving along an optical axis such that a distance between the first lens group and the second lens group gradually becomes greater, a distance between the second lens group and the third lens group gradually becomes smaller, and a distance between the third lens group and the fourth lens group gradually becomes greater when changing magnification from a wide angle end to a telephoto end, and
   the zoom lens satisfies at least one of the following conditional formulae:

$$-1.05 < fw/f2 < -0.85 \tag{1}'$$

$$0.8 < fw/f4 < -0.5 \tag{2}'$$

wherein fw is the focal length of the entire system at the wide angle end, f2 is the focal length of the second lens group, and f4 is the focal length of the fourth lens group.

2. An imaging apparatus comprising a zoom lens as claimed in claim 1.

3. The zoom lens as claimed in claim 1, wherein:
   the fourth lens group comprises a first lens, a second lens, and a third lens, the first lens in the fourth lens group having a positive refractive power, the second lens in the fourth lens group having a negative refractive power, and the third lens in the fourth lens group having a positive refractive power, provided in this order from the object side.

4. The zoom lens as claimed in claim 3, wherein:
   the refractive index of the second lens is higher than the refractive indices of the first lens and the third lens.

5. The zoom lens as claimed in claim 3, wherein:
   the second lens and the third lens are cemented together.

6. The zoom lens as claimed in claim 5, wherein:
   the refractive index of the second lens is higher than the refractive indices of the first lens and the third lens.

* * * * *